US008891484B2

(12) United States Patent
Ahluwalia

(10) Patent No.: US 8,891,484 B2
(45) Date of Patent: Nov. 18, 2014

(54) FACILITATING METHOD FOR HANDOVER OF A MOBILE COMMUNICATION DEVICE

(75) Inventor: Jagdeep Singh Ahluwalia, Sutton (GB)

(73) Assignee: NEC Corporation, Tokyo (JP)

( * ) Notice: Subject to any disclaimer, the term of this patent is extended or adjusted under 35 U.S.C. 154(b) by 74 days.

(21) Appl. No.: 13/412,666

(22) Filed: Mar. 6, 2012

(65) Prior Publication Data

US 2012/0163342 A1    Jun. 28, 2012

Related U.S. Application Data

(63) Continuation of application No. 12/310,157, filed on Feb. 13, 2009, now Pat. No. 8,228,869.

(30) Foreign Application Priority Data

Aug. 22, 2006  (GB) .................................. 0616682.1
Oct. 3, 2006   (GB) .................................. 0619524.2

(51) Int. Cl.
   *H04W 4/00*   (2009.01)
   *H04L 1/18*   (2006.01)
   *H04W 36/02*  (2009.01)
   *H04L 1/16*   (2006.01)

(52) U.S. Cl.
   CPC ............ *H04L 1/1887* (2013.01); *H04W 36/02* (2013.01); *H04L 1/1874* (2013.01); *H04L 1/1664* (2013.01)
   USPC ........................................................ 370/331

(58) Field of Classification Search
   CPC ............................. H04W 36/02; H04L 1/1874
   USPC ........... 370/331, 428; 455/439, 436, 442, 445
   See application file for complete search history.

(56) References Cited

U.S. PATENT DOCUMENTS

| 5,940,371 A  | 8/1999  | Mitts et al.  |
| 6,466,556 B1 | 10/2002 | Boudreaux     |
| 6,519,223 B1 | 2/2003  | Wager et al.  |

(Continued)

FOREIGN PATENT DOCUMENTS

| EP | 0 777 396 A1 | 6/1997 |
| EP | 0 851 633 A2 | 7/1998 |

(Continued)

OTHER PUBLICATIONS

Japanese Office Action dated Dec. 14, 2011—U.S. Appl. No. 12/310,157 (with a partial English translation).
U.S. Office Action dated Mar. 1, 2013 in co-pending related U.S. Appl. No. 13/404,200.
Russian Office Action dated Nov. 17, 2010 with English translation.
3GPP TS 25.912 V7.0.0 (Jun. 2006).

(Continued)

*Primary Examiner* — Chandrahas Patel
(74) *Attorney, Agent, or Firm* — McGinn IP Law Group, PLLC

(57) ABSTRACT

A method, performed in a long term evolution (LTE) communications network, of facilitating handover of a mobile communication device from a source node to a target node includes receiving, in the target node, downlink user data packets forwarded from the source node via a first interface, receiving, in the target node, downlink user packets from an external source via a second interface, buffering the received user data packets during handover prior to sending to the mobile communication device, ordering the downlink data packets in the target node based on the interface from which the data packets are received, and sending the ordered downlink data packets from the target node to the mobile communication device after completion of handover from the source node to the target node.

14 Claims, 12 Drawing Sheets

(56) References Cited

U.S. PATENT DOCUMENTS

| | | | |
|---|---|---|---|
| 7,307,971 | B2 | 12/2007 | Park et al. |
| 7,512,099 | B2 | 3/2009 | Ameigeiras et al. |
| 7,596,385 | B2 * | 9/2009 | Aghvami et al. .......... 455/552.1 |
| 7,813,361 | B2 | 10/2010 | Lee et al. |
| 8,155,083 | B2 | 4/2012 | Sachs et al. |
| 2003/0119488 | A1 | 6/2003 | Hans et al. |
| 2005/0192010 | A1 | 9/2005 | Kirla |
| 2006/0056350 | A1 | 3/2006 | Love et al. |
| 2009/0067628 | A1 | 3/2009 | Pudney et al. |

FOREIGN PATENT DOCUMENTS

| | | |
|---|---|---|
| EP | 0 891 114 A1 | 1/1999 |
| EP | 1 198 107 A2 | 4/2002 |
| EP | 1 331 832 A2 | 1/2003 |
| EP | 1 343 267 A2 | 9/2003 |
| EP | 1 549 097 A1 | 6/2005 |
| GB | 2 374 494 A | 10/2002 |
| JP | 09-186704 A | 7/1997 |
| JP | 10-210533 A | 8/1998 |
| RU | 2 265 959 C2 | 12/2005 |
| WO | WO 2005/074308 A1 | 8/2005 |
| WO | WO 2005/084060 A1 | 9/2005 |
| WO | WO 2006/079879 A1 | 8/2006 |
| WO | WO 2008/023814 A3 | 2/2008 |

OTHER PUBLICATIONS

3GPP TS 25.xxx V0.0.4 (Aug. 2006).

William Wolf, "Handover in Wireless ATM", Master of Science Thesis, Nov. 1997, Tampere University of Technology.

Interdigital Communication: "Intra-LTE Handover-Context Transfer and Data forwarding", 3GPP Draft; R3-060751, $3^{rd}$ Generation Partnership Project (3GPP) Mobile Competence Centre; 650, Route Des Lucioles; F-06921 Sophia-Antipolis Cedex; France, vol. RAN WG3, No. Shanghai, China; May 4, 2006, XP050159655.

Samsung: "Inter-ENG Handover: Data Unit Forwarding for DL1" 3GPP Draft; R3-060622, $3^{rd}$ Generation partnership Project (3GPP), Mobile Competence Centre; 650, Route Des Lusioles; R-06921 Sophia-Antipolis Cedex; France, vol. RAN WG3, No. Shanghai, China; 20060503, May 3, 2006, XP050159558.

European Search Report dated Apr. 7, 2011.

"Universal Mobile Telecommunications System (UMTS); Feasibility Study for evolved Universal Terrestrial Radio Access (UTRA) and Universal Terrestrial Radio Access Network (UTRAN) (3GPP TR 25.912 Version 7.0.0 Release 7)" $3^{rd}$ Generation Partnership Project (3GPP); Technical Report (Tr), XX, XX, vol. 25.912, No. V700, Jun. 2006, pp. 1-55, XP00245775.

"Lossless/Seamless Intra-LTE Handover" R2-063138, NEC, Riga, Latvia, Nov. 6-10, 2006.

Lossless/Seamless Intra-LTE Handover R2-0602948, NEC, Seoul, Korea Oct. 9-13, 2006.

* cited by examiner

FACILITATING METHOD FOR HANDOVER OF A MOBILE COMMUNICATION DEVICE

The present application is a Continuation application of U.S. patent application Ser. No. 12/310,157, filed on Feb. 13, 2009, now U.S. Pat. No. 8,228,869 which is based on and claims priority from UK patent application No. 0616682.1, filed on Aug. 22, 2006 and UK patent application No. 0619524.2, filed on Oct. 3, 2006, the disclosures of which are incorporated herein in their entirety by reference.

TECHNICAL FIELD

The present invention relates to mobile telecommunications networks, particularly but not exclusively networks operating according to the 3GPP standards or equivalents or derivatives thereof. The present invention relates also to the management of data packets in the mobile telecommunications networks.

BACKGROUND ART

In mobile telecommunications networks, there is a requirement for User Equipment (UE) to handover from one base station to another. In the 3GPP, there has been recently proposed a procedure defined in the control plane (C-plane) for handover (HO) from a source eNodeB to a target eNodeB. The various acronyms applicable to 3 G communications will of course be familiar to those skilled in the art but a glossary is appended for the benefit of lay readers.

DISCLOSURE OF INVENTION

Although for efficiency of understanding for those of skill in the art the invention will be described in detail the context of a 3G system, the principles of handover can be applied to other systems, e.g. other CDMA or wireless in which a mobile device or User Equipment (UE) communicates with one of several other devices (corresponding to eNodeB) with the corresponding elements of the system changed as required.

It has been noted that with current 3GPP handover proposals [for example as set out in Handover of downlink user plane data for RT services, www.3gpp.org-/ftp/tsg ran/WG3 lu/TSGR3 51 bis/docs/R3-060454.zip], only a few downlink (DL) data packets must be forwarded from source to target eNodeB for real time services during handover execution. This may result, in the worst case, in a loss of single data packet or delayed delivery. It has been generally considered that either of these events could be acceptable, it would naturally be desirable not to have data loss but it has been considered to be inevitable given the operating constraints. It has been generally agreed that the user data should be forwarded from source eNodeB to target eNodeB for both real-time and non-real-time services during the handover execution phase, rather than by applying different mechanisms in a service dependent way.

According to the present invention, it has been proposed that data loss can in fact be avoided during handover, without necessarily complicating signalling or adding significant further overhead or delay. The invention stems from the appreciation that data loss can be avoided (or at least reduced) by implicit signalling without requiring explicit control signals.

The applicant has recently proposed a lossless HO procedure. This proposal is set out in http://www.3gpp.org/ftp/tsg ran/WG3 lu/TSGR3 53/docs/R3-061088.zip. In the proposed system, the source eNodeB stops transmitting data before sending the HO command but continues receiving the data and the UE stops transmitting data after it receives the HO command. After sending the HO command, DL data received at the source eNodeB from the Access Gateway for transmission to the UE is buffered and sent to the target eNodeB for onward delivery once the UE has established a communication link with the target eNodeB. The present application describes a way in which the buffering of the data can be managed in the source eNodeB. For completeness, a description will also be given of the original proposal for lossless handover.

According to a first aspect of the present invention, there is provided a method of facilitating handover of a mobile communication device from a source node to a target node, the method comprising buffering received user data packets in the target node during handover prior to sending to the mobile device.

According to a second aspect of the present invention, there is provided a target node of a mobile communication system comprising:

means for receiving a handover request, requesting handover of a mobile device from a source node to the target node;

means for sending a handover response;

means for receiving user data packets during handover, for transmission to the mobile device;

means for sending user data packets to the mobile device after handover completion; and means for buffering the received user data packets during handover prior to sending to the mobile device.

According to a third aspect of the present invention, there is provided a target node of a mobile communication system comprising:

a first receiver operable to receive a handover request, requesting handover of a mobile device from a source node to the target node;

a first transmitter operable to transmit a handover response;

a second receiver operable to receive user data packets during handover, for transmission to the mobile device;

a second transmitter operable to transmit user data packets to the mobile device after handover completion; and a buffer operable to buffer the received user data packets during handover prior to transmission to the mobile device.

According to a fourth aspect of the present invention, there is provided a method of facilitating handover of a mobile communication device from a source node to a target node, the method comprising, in response to receipt of a handover response at the source node, stopping forwarding of downlink user data packets to the mobile communication device whilst continuing to receive uplink user data packets from the user device and sending a handover command to the mobile device.

According to a fifth aspect of the present invention, there is provided a source node of a mobile communication system comprising:

means for forwarding downlink data packets to a mobile communication device;

means for receiving uplink user data packets from the mobile communication device;

means for receiving a handover response indicating handover of the mobile communication device from the source node to a target node;

means for controlling said forwarding means, in response to receipt of said handover response, so that said forwarding means stops forwarding said downlink user data packets to the mobile communication device whilst said receiving means continues to receive uplink user data packets from the user device; and means for sending a handover command to the mobile device after said forwarding means stops forwarding said downlink user data packets.

According to a sixth aspect of the present invention, there is provided a method of facilitating handover of a mobile communication device from a source node to a target node during which handover user data packets are forwarded from the source node to the target node, the method comprising receiving forwarded data packets at the target node from the source node via a first interface and receiving data packets from an external source via a second interface and ordering the data packets for transmission to the mobile communication device based on the interface from which the data packets are received.

According to a seventh aspect of the present invention, there is provided a target node of a communication network comprising:

a first interface for receiving, during handover of a mobile device from a source node to the target node, downlink user data packets from the source node;

a second interface for receiving user data packets for the mobile device from an external source; and means for ordering the data packets for transmission to the mobile communication device based on the interface from which the data packets are received.

According to an eighth aspect of the present invention, there is provided a communication method performed in a source node of a telecommunication system, the method comprising:

receiving Service Data Units, SDUs, for transmission to a mobile communication device;

storing a copy of the SDUs in an SDU management buffer;

passing the SDUs to a concatenation and segmentation unit to generate Protocol Data Units, PDUs;

storing the PDUs in a transmit buffer for transmission to the mobile communication device;

sending a feedback message to the SDU management buffer identifying an SDU that can be removed from the SDU management buffer when, for Unacknowledge Mode, UM, data, the PDUs corresponding to that SDU have been forwarded from the transmission buffer or when, for Acknowledge Mode, AM, data, receipt of the PDUs corresponding to that SDU have been acknowledged by the mobile communication device;

in response to the receipt of the feedback message, removing the identified SDU from the SDU management buffer; and during handover of the mobile communication device from the source node to a target node, forwarding SDUs for the mobile communication device to the target node in dependence upon the SDUs stored in said SDU management buffer.

According to a ninth aspect of the present invention, there is provided a source node of a telecommunication system, the source node comprising:

means for receiving Service Data Units, SDUs, for transmission to a mobile communication device;

an SDU management buffer for storing a copy of the SDUs;

a concatenation and segmentation unit for generating Protocol Data Units, PDUs from the SDUs;

a transmission buffer for storing the PDUs prior to transmission to the mobile communication device;

means for sending a feedback message to the SDU management buffer identifying an SDU that can be removed from the SDU management buffer when, for Unacknowledge Mode, UM, data, the PDUs corresponding to that SDU have been forwarded from the transmission buffer or when, for Acknowledge Mode, AM, data, receipt of the PDUs corresponding to that SDU have been acknowledged by the mobile communication device;

means for removing, in response to the receipt of the feedback message, the identified SDU from the SDU management buffer; and means for forwarding, during handover of the mobile communication device from the source node to a target node, SDUs for the mobile communication device to the target node in dependence upon the SDUs stored in said SDU management buffer.

According to a tenth aspect of the present invention, there is provided a communication method performed in a mobile communication device of a telecommunication system, the method comprising:

receiving Service Data Units, SDUs, for transmission to a source node of the telecommunication system;

storing a copy of the SDUs in an SDU management buffer;

passing the SDUs to a concatenation and segmentation unit to generate Protocol Data Units, PDUs;

storing the PDUs in a transmit buffer for transmission to the source node;

sending a feedback message to the SDU management buffer identifying an SDU that can be removed from the SDU management buffer when, for Unacknowledge Mode, UM, data, the PDUs corresponding to that SDU have been forwarded from the transmission buffer or when, for Acknowledge Mode, AM, data, receipt of the PDUs corresponding to that SDU have been acknowledged by the source node;

in response to the receipt of the feedback message, removing the identified SDU from the SDU management buffer;

receiving a status report from the source node;

receiving a handover command from the source node after receiving the status report; and after completing handover to a target node, using the received status report to control which SDUs are passed to the concatenation and segmentation unit to form PDUs for transmission to the target node.

According to an eleventh aspect of the present invention, there is provided a mobile communication device comprising:

means for receiving Service Data Units, SDUs, for transmission to a source node of the telecommunication system;

an SDU management buffer for storing a copy of the SDUs;

a concatenation and segmentation unit for generating Protocol Data Units, PDUs from the SDUs;

a transmit buffer for storing the PDUs prior to transmission to the source node;

means for sending a feedback message to the SDU management buffer identifying an SDU that can be removed from the SDU management buffer when, for Unacknowledge Mode, UM, data, the PDUs corresponding to that SDU have been forwarded from the transmission buffer or when, for Acknowledge Mode, AM, data, receipt of the PDUs corresponding to that SDU have been acknowledged by the source node;

means for removing, in response to the receipt of the feedback message, the identified SDU from the SDU management buffer;

means for receiving a status report from the source node;

means for receiving a handover command from the source node after receiving the status report; and means for using, after completing handover to a target node, the received status report to control which SDUs are passed to the concatenation and segmentation unit to form PDUs for transmission to the target node.

According to a twelfth aspect of the present invention, there is provided a method performed by a source node of a telecommunication node, the method comprising:

buffering downlink user data packets for transmission to a mobile communication device in a buffer;

sending downlink user data packets to the mobile communication device;

receiving a handover response indicating handover of the mobile communication device to a target node; and selectively forwarding user data packets from said buffer to said target node in dependence upon an RLC status report or HARQ feedback information.

According to a thirteenth aspect of the present invention, there is provided a communication method performed in a source node of a telecommunication system, the method comprising:

receiving Service Data Units, SDUs, for transmission to a mobile communication device;

storing a copy of the SDUs in an SDU management buffer;

passing the SDUs to a concatenation and segmentation unit to generate Protocol Data Units, PDUs;

storing the PDUs in a transmit buffer for transmission to the mobile communication device;

sending a feedback message to the SDU management buffer identifying an SDU that can be removed from the SDU management buffer when, for Unacknowledge Mode, UM, data, the PDUs corresponding to that SDU have been forwarded from the transmission buffer or when, for Acknowledge Mode, AM, data, receipt of the PDUs corresponding to that SDU have been acknowledged by the mobile communication device;

in response to the receipt of the feedback message, removing the identified SDU from the SDU management buffer; and during handover of the mobile communication device from the source node to a target node, selectively forwarding SDUs for the mobile communication device to the target node in dependence upon an RLC status report or HARQ feedback information.

According to a fourteenth aspect of the present invention, there is provided a source node of a telecommunication node, the source node comprising:

a buffer for buffering downlink user data packets for transmission to a mobile communication device;

means for sending downlink user data packets to the mobile communication device;

means for receiving a handover response indicating handover of the mobile communication device to a target node; and means for selectively forwarding user data packets from said buffer to said target node in dependence upon an RLC status report or HARQ feedback information.

According to a fifteenth aspect of the present invention, there is provided a source node of a telecommunication system, the source node comprising:

means for receiving Service Data Units, SDUs, for transmission to a mobile communication device;

an SDU management buffer for storing a copy of the SDUs;

a concatenation and segmentation unit for generating Protocol Data Units, PDUs;

a transmit buffer for storing the PDUs for transmission to the mobile communication device;

means for sending a feedback message to the SDU management buffer identifying an SDU that can be removed from the SDU management buffer when, for Unacknowledge Mode, UM, data, the PDUs corresponding to that SDU have been forwarded from the transmission buffer or when, for Acknowledge Mode, AM, data, receipt of the PDUs corresponding to that SDU have been acknowledged by the mobile communication device;

means for removing, in response to the receipt of the feedback message, the identified SDU from the SDU management buffer; and means for selectively forwarding, during handover of the mobile communication device from the source node to a target node, SDUs for the mobile communication device to the target node in dependence upon an RLC status report or HARQ feedback information.

According to a sixteenth aspect of the present invention, there is provided a method of facilitating handover of a mobile communication device from a source node to a target node, the method comprising:

at the source node, in response to receiving a handover response from the target node: sending a status packet to the mobile communication device and after sending the status packet stopping the transmission of downlink user data from the source node to the mobile communication device; and at the mobile communication device, in response to receiving a handover command from the source node: sending a status packet to the source node and after sending the status packet stopping the transmission of uplink user data from the mobile communication device to the source node.

According to a seventeenth aspect of the present invention, there is provided a source node of a telecommunication system, the source node comprising:

means for receiving uplink user data packets from a mobile communication device;

means for transmitting downlink user data packets to the mobile communication device;

means for receiving a handover response indicating handover of the mobile communication device from the source node to a target node;

means for generating, in response to receipt of said handover response, a status report indicating uplink data packets received from the mobile communication device;

means for sending the generated status report to the mobile communication device; and means for stopping the transmission of downlink user data from the source node to the mobile communication device after sending said status report.

According to an eighteenth aspect of the present invention, there is provided a mobile communication device comprising:

means for receiving downlink user data packets from a source node of a telecommunication system;

means for transmitting uplink user data packets to said source node;

means for receiving a handover command from the source node indicating handover to a target node of the telecommunication system;

means for generating, in response to receiving said handover command, a status packet indicating downlink user data packets that have been received;

means for sending the status report to the source node; and means for stopping the transmission of uplink user data packets from the mobile communication device to the source node after sending said status report.

According to a nineteenth aspect of the present invention, there is provided a method of facilitating handover of a mobile communication device from a source node to a target node, the method being performed in the source node and comprising:

receiving a status packet from the mobile communication device; and forwarding user data packets to the target node in dependence upon information contained in the received status packet.

According to a twentieth aspect of the present invention, there is provided a source node of a telecommunication system, the source node comprising:

means for receiving a handover response from a target node indicating handover of a mobile communication device from the source node to the target node;

means for stopping, in response to receiving said handover response, transmission of downlink user data from the source node to the mobile communication device;

means for transmitting a handover command to said mobile communication device after stopping the transmission of said downlink user data;

means for receiving a status packet from the mobile communication device; and means for forwarding user data packets to the target node in dependence upon information contained in the received status packet.

According to a twenty-first aspect, user data transmission is stopped implicitly, without requiring further signalling overhead, when a node "realises" that a handover is in progress This solution departs from the conventional philosophy of signalling actions to be performed and requires a modification to a conventional node to relate control plane (C-plane) and user plane (U-plane) activity but has benefits as discussed.

Preferably data packets are forwarded from a source to a target node during handover, this avoids the need for retransmission from the external source to the target node.

Preferably the packets are ordered at the target node prior to sending. It has been appreciated that the ordering can be made more efficient and elegant by a further related use of implicit signalling, based on the interface by which the target node receives the packets. This may be independently provided in a twenty-second aspect.

Preferably the downlink packets are buffered at the target node. This may seem contrary to the conventional principle of forwarding packets with minimal delay but it has been appreciated that the delay is small and the net effect, even for time critical services such as Voice over IP may be beneficial. This feature may be independently provided in a twenty-third aspect.

Preferably, in addition to suspending downlink activity, uplink activity is also implicitly suspended, and this is provided independently in a twenty-fourth aspect.

Preferably the uplink packets are buffered in the mobile device. As with the twenty-third aspect, this may seem contrary to the conventional principle of forwarding packets with minimal delay but it has been appreciated that the delay is small and the net effect, even for time critical services such as Voice over IP may be beneficial. This feature may be independently provided in a twenty-fifth aspect.

A particularly advantageous feature of the above aspects is that they facilitate separate suspending of uplink and downlink data transmission. Thus, contrary to conventional proposals, a source node may suspend transmission but continue reception of user data and thus packets m transit are not lost. This may be provided independently in a twenty-sixth aspect.

Whilst each of the features may be provided independently to provide advantages, for example downlink packets may be suspended without suspending uplink packets or by using a different mechanism to suspend uplink packets or vice versa (and this may be advantageous where it is easier to modify only one of the user equipment or the base), there is a particular advantage to providing implicit suspension of both uplink and downlink data. Similarly while buffering data packets during handover may in itself improve use of the air interface and implicit ordering of packets may simplify processing, the complete suite of closely inter-related but independent features mentioned above, including buffering and implicit ordering at the target node gives a highly efficient mechanism for avoiding data loss with negligible overhead.

According to a twenty-seventh aspect, the present invention provides a communication method performed in a telecommunication system, the method comprising: receiving Service Data Units, SDUs, for transmission to a mobile communication device; storing a copy of the SDUs in an SDU management buffer; passing the SDUs to a concatenation and segmentation unit to generate Protocol Data Units, PDUs; storing the PDUs in a transmit buffer for transmission to the mobile communication device; sending a feedback message to the SDU management buffer identifying an SDU that can be removed from the SDU management buffer when, for Unacknowledge Mode, UM, data, the PDUs corresponding to that SDU have been forwarded from the transmission buffer or when, for Acknowledge Mode, AM, data, receipt of the PDUs corresponding to that SDU have been acknowledged by the mobile communication device; and in response to the receipt of the feedback message, removing the identified SDU from the SDU management buffer.

The method may be performed in the node of a telecommunications network or in a user equipment, such as a mobile telephone. When performed in a node and the node receives a handover response from a target node, the source node stops forwarding user data packets to the mobile communication device and forwards SDUs stored in the SDU management buffer to the target node.

Preferably the source node continues to receive user data packets from the mobile communication device after stopping forwarding user data packets to the mobile communications device. If those received data packets include acknowledgements for any AM PDUs and, if appropriate, another feedback message is sent to the SDU management buffer to remove an SDU from the SDU management buffer before it is forwarded to the target node.

Forwarded SDUs received at the target node from the source node are sent to the mobile communication device after completion of handover from the source node to the target node.

In the case of AM mode data, the feedback message is sent to the SDU management buffer from a PDU retransmission buffer and management entity after the PDU retransmission buffer and management entity has received acknowledgement receipts for all the PDUs corresponding to the SDU.

In the case of UM mode data, the feedback message is sent to the SDU management buffer by the transmit buffer after all the PDUs corresponding to the SDU have been forwarded from the transmission buffer.

According to a twenty-eighth aspect, the invention provides a method of facilitating handover of a mobile communication device from a source node to a target node, the method comprising:

at the source node, in response to receiving a handover response from the target node, sending a status packet to the mobile communication device and after sending the status packet stopping the transmission of downlink user data from the source node to the mobile communication device, and at the mobile communication device, in response to receiving a handover command from the source node, sending a status packet to the source node and after sending the status packet stopping the transmission of uplink user data from the mobile communication device to the source node.

This method may be implemented in addition to or separately from the method of the twenty-seventh aspect mentioned above.

In one embodiment the information contained in the status packet received by the source node from the mobile communication device is used to select user data packets held by the source node to be forwarded from the source node to the target node.

According to a twenty-ninth aspect, the invention provides a method of facilitating handover of a mobile communication device from a source node to a target node, the method being performed in the source node and comprising, in response to receiving a handover response from the target node:

stopping the transmission of downlink user data from the source node to the mobile communication device;

transmitting a handover command to said mobile communication device after stopping the transmission of said downlink user data;

receiving a status packet from the mobile communication device, and forwarding user data packets to the target node in dependence upon information contained in the received status packet.

This method may also be implemented in addition to or separately from the methods of the twenty-eighth and the twenty-seventh aspects described above.

While the invention is described for ease of understanding in the context of handover from one 3G eNodeB to another, the principles may be extended to handover between nodes of different networks, e.g. a 3G network and another network.

The invention provides, for all methods disclosed, corresponding computer programs or computer program products for execution on corresponding equipment, the equipment itself (user equipment, nodes or components thereof) and methods of updating the equipment.

BRIEF DESCRIPTION OF THE DRAWINGS

Exemplary embodiments of the invention will now be described, by way of example, with reference to the accompanying drawings in which.

BEST MODE FOR CARRYING OUT THE INVENTION

Referring to FIGS. 1-5, a first exemplary embodiment of this invention will now be described.

Figure 1:
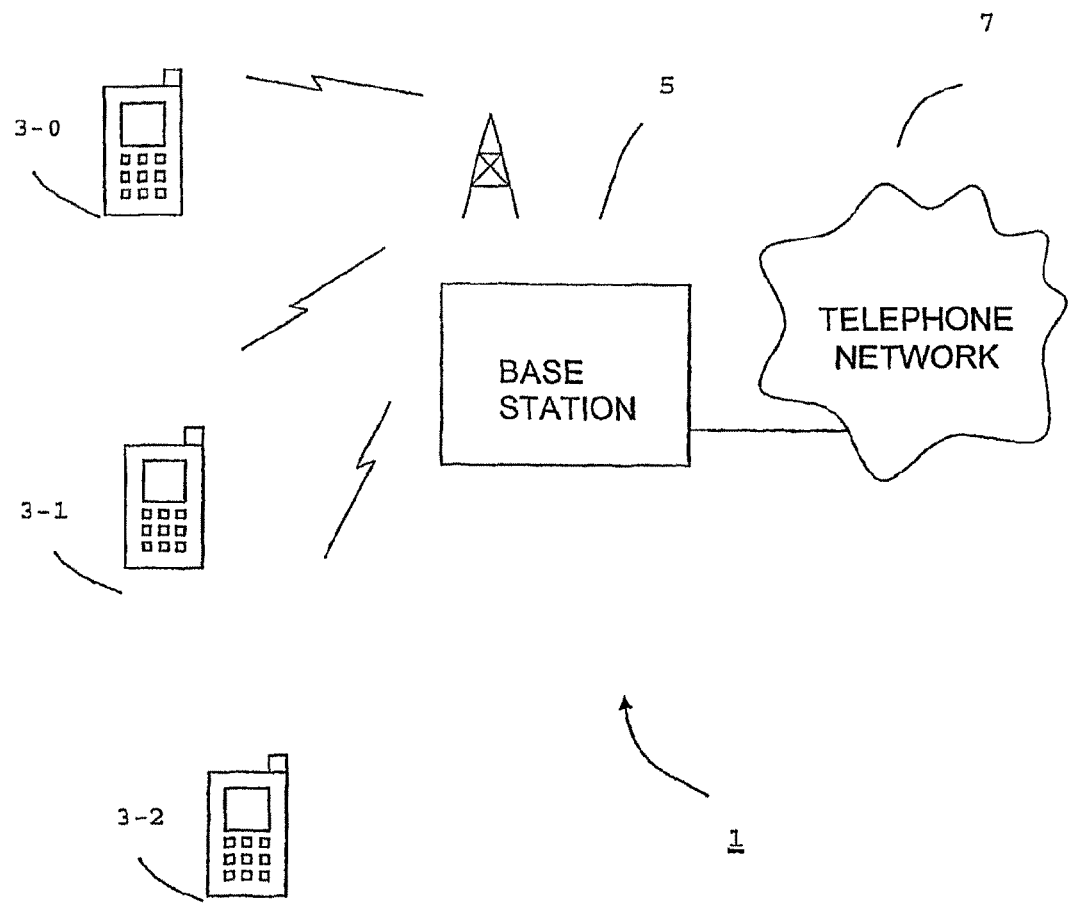
FIG. 1 schematically illustrates a mobile telecommunication system of a type to which a first exemplary embodiment of this invention is applicable.

FIG. 1 schematically illustrates a mobile (cellular) telecommunication system 1 in which users of mobile telephones (MT) 3-0, 3-1, and 3-2 can communicate with other users (not shown) via a base station 5 and a telephone network 7. In this embodiment (that is, the first exemplary embodiment of this invention), the base station 5 uses an orthogonal frequency division multiple access (OFDMA) technique in which the data to be transmitted to the mobile telephones 3 is modulated onto a plurality of sub-carriers. Different sub-carriers are allocated to each mobile telephone 3 depending on the supported bandwidth of the mobile telephone 3 and the amount of data to be sent to the mobile telephone 3. In this embodiment, the base station 5 also allocates the sub-carriers used to carry the data to the respective mobile telephones 3 in order to try to maintain a uniform distribution of the mobile telephones 3 operating across the base station's bandwidth.

Base Station

Figure 2:
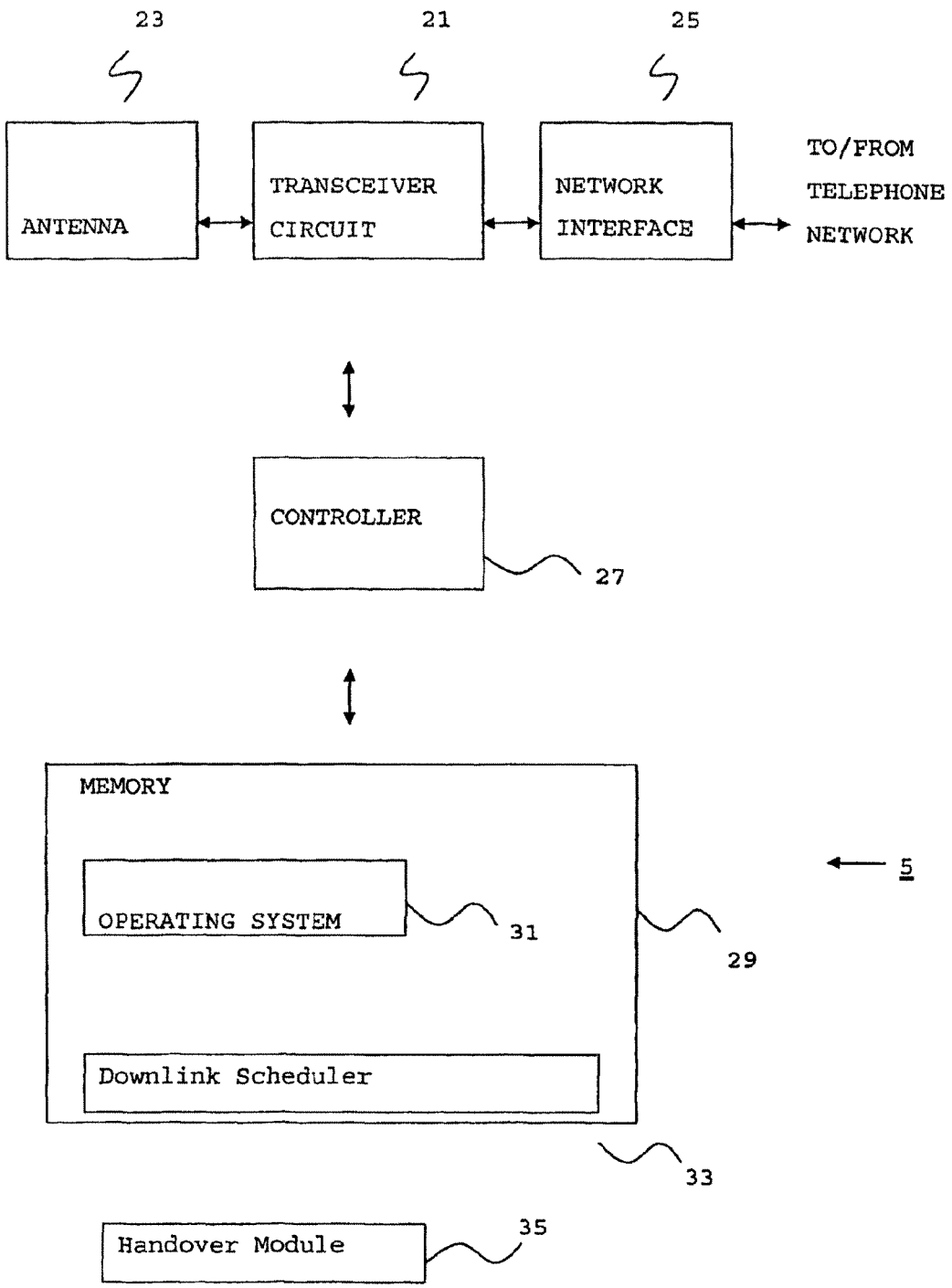
FIG. 2 schematically illustrates a base station according to the first exemplary embodiment.

FIG. 2 is a block diagram illustrating the main components of the base station 5 used in this embodiment. As shown, the base station 5 includes a transceiver circuit 21 which is operable to transmit signals to and to receive signals from the mobile telephones 3 via one or more antennae 23 (using the above described sub-carriers) and which is operable to transmit signals to and to receive signals from the telephone network 7 via a network interface 25. The operation of the transceiver circuit 21 is controlled by a controller 27 in accordance with software stored in memory 29. The software includes, among other things, an operating system 31 and a downlink scheduler 33. The downlink scheduler 33 is operable for scheduling user data packets to be transmitted by the transceiver circuit 21 in its communications with the mobile telephones 3. The software also includes a handover module 35, the operation of which will be described below.

Mobile Telephone

Figure 3:
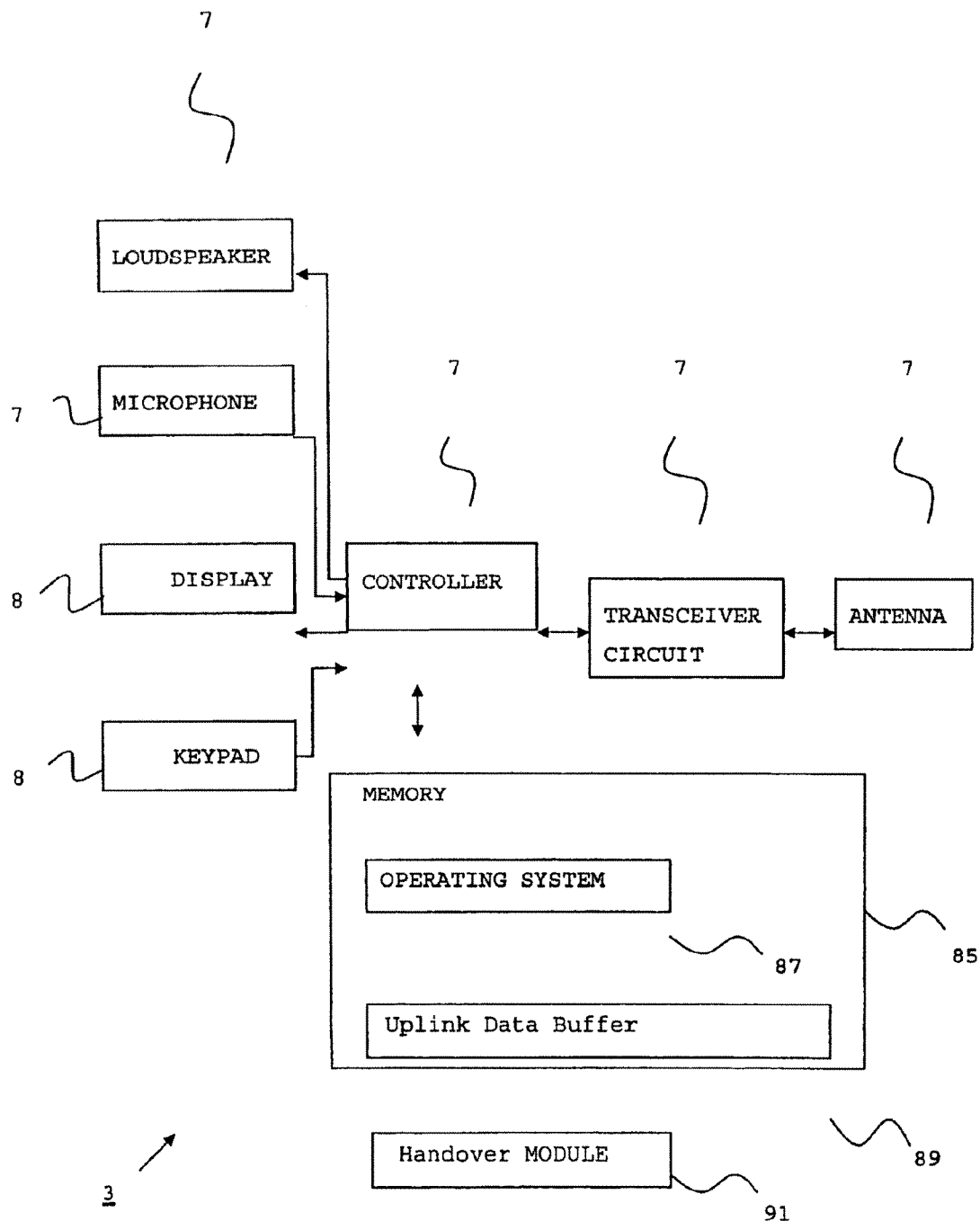
FIG. 3 schematically illustrates a mobile communication device according to the first exemplary embodiment.

FIG. 3 schematically illustrates the main components of each of the mobile telephones 3 shown in FIG. 1. As shown, the mobile telephones 3 include a transceiver circuit 71 that is operable to transmit signals to and to receive signals from the base station 5 via one or more antennae 73. As shown, the mobile telephone 3 also includes a controller 75 which controls the operation of the mobile telephone 3 and which is connected to the transceiver circuit 71 and to a loudspeaker 77, a microphone 79, a display 81, and a keypad 83. The controller 75 operates in accordance with software instructions stored within memory 85. As shown, these software instructions include, among other things, an operating system 87. In this embodiment, the memory also provides an uplink data buffer 89. The software for controlling the handover process is provided by a handover module 91, the operation of which will be described below.

In the above description, both the base station and mobile device are described for ease of understanding as having respective discrete handover modules which implement certain of the inventive features. Whilst the features may be provided in this way for certain applications, for example where an existing system has been modified to implement the invention, in other applications, for example in systems designed with the inventive features in mind from the outset, the handover features may be built into the overall operating system or code and so a handover module as a discrete entity may not be discernible.

Description of the Related Handover Protocol

Figure 4:
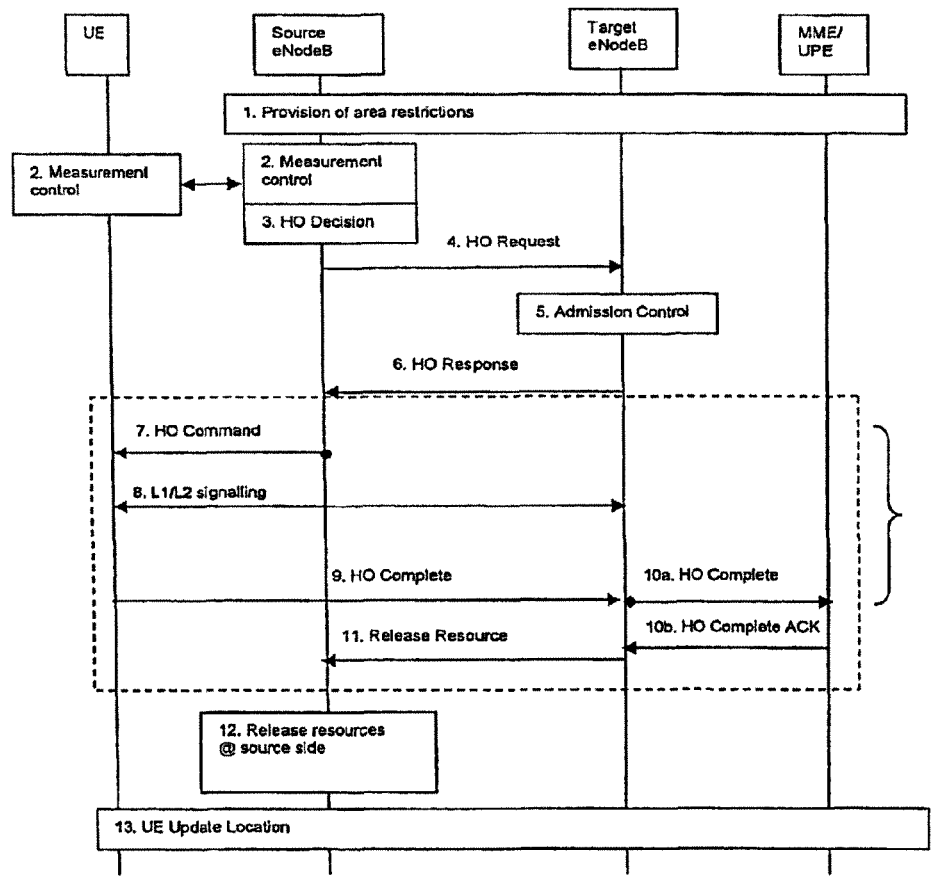
FIG. 4 shows a related handover process.

Before describing the inventive features further in detail, it may be helpful to summarize related handover protocol, with reference to FIG. 4. The related signalling flow for the control plane is taken as the basis for further discussion. The description from TR 25.912 for the signalling sequence is also included.

1) The UE context within the source eNodeB contains information regarding roaming restrictions which where provided either at connection establishment or at the last TA update.

2) The source eNodeB entity configures the UE measurement procedures according to the area restriction information. Measurements provided by the source eNodeB entity may assist the function controlling the UE's connection mobility.

3) Based-on measurement-results from-the UE and the source eNodeB, probably assisted by additional RRM specific information, the source eNodeB decides to handover the UE to a cell controlled by the target eNodeB.

4) The source eNodeB issues a handover Request to the target eNodeB entity passing necessary information to prepare the handover at the target side. The target eNodeB configures the required resources.

5) Admission Control is performed by the target eNodeB to increase the likelihood of a successful handover, if the resources can be granted by target eNodeB.

6) The handover preparation is finished at the target side, information for the UE to reconfigure the radio path towards the target side is passed to the source eNodeB.

A) from step 7) until 12) means to avoid data toss during handover are provided.

7) The UE is commanded by the source eNodeB entity to perform the handover, target side radio resource information is contained.

8) The UE gains synchronisation at the target side.

9) Once the UE has successfully accessed the cell, it sends an indication to the target eNodeB that the handover is completed.

10) The MME/UPE is informed that the UE has changed cell. The UPE switch the data path to the target side and can release any U-plane/TNL resources towards the source eNodeB.

11) The MME/UPE confirms the handover Complete message with the handover Complete ACK message.

12) The target eNodeB triggers the release of resources at the source side. The target eNodeB can send this message directly after reception of message 9.

13) Upon reception of the Release Resource message, the source eNodeB can release radio and C-plane related resources in relation to the UE context. The source eNodeB should continue to perform data forwarding until an implementation dependent mechanism decides that data forwarding can be stopped and U-plane/TNL resources can be released.

14) If the new cell is member of a new Tracking Area, the UE needs to register with the MME/UPE which in turn updates the area restriction information on the target side.

The description that follows mainly applies to acknowledge mode RLC although the outer ARQ entity for LTE may not be identical to the RLC in all aspects. Specifics of unacknowledged mode RLC entities employed for real time applications such as VoIP and streaming are also brought out wherever there is a different handling applied as compared to the acknowledge mode entities.

In order to transfer the context and forward the data to support lossless inter eNodeB handover, we have appreciated that it is desirable that the source eNodeB is able to synchronize the data transmission status between itself and target data eNodeB during handover. From this we have concluded that the data flow should desirably be stopped at an appropriate instant in time during handover execution phase considering that the interruption time for the user plane data is minimal. However, fulfilling this desired requirement is not straightforward as stopping the data transmission through additional signalling would be problematic as it would an increase the overall handover time. We have appreciated that it is possible implicitly to stop the data transmission in (one or both, preferably both) the source eNodeB and UE at the time of handover execution, by modifying the conventional arrangement to build in some "realisation" of the handover process in the User data transfer process. A further desirable feature is that, whether, RLC SDUs or RLC PDUs based forwarding is adopted, the number of duplicated packets transmitted over the air either by the target ENB or by the UE is minimized.

Figure 5:
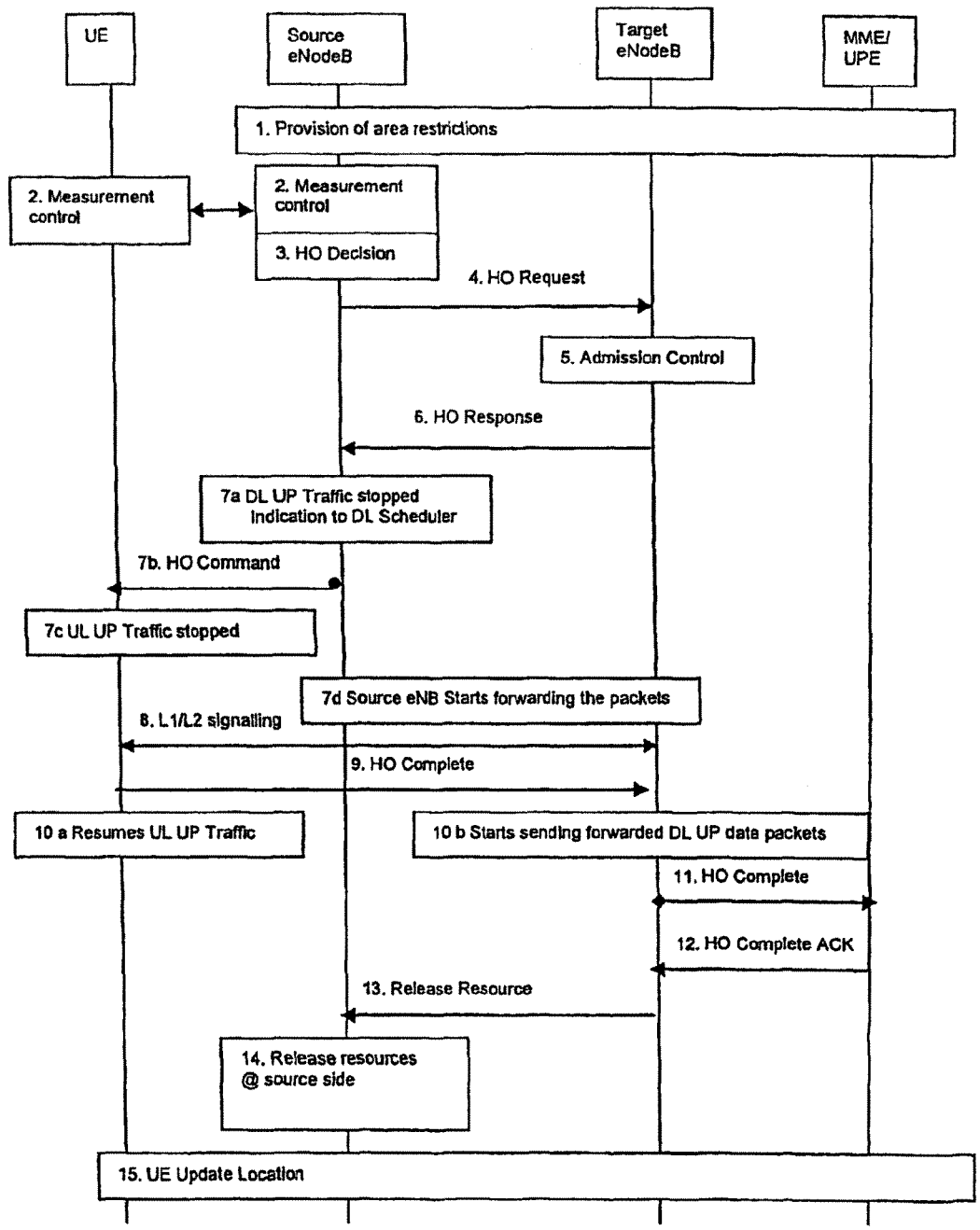
FIG. 5 shows a modified handover process according to the first exemplary embodiment.

We have proposed that the signalling sequence in FIG. 4 be modified as shown in FIG. 5 which shows timings when we propose the data transmission in DL and UL are stopped with the details of the modified sequences described. We explain below how this approach of stopping the data flow facilitates achieving a fast lossless handover for LTE.

Referring to FIG. 5, information flow for Intra-LTE-Access Mobility Support is described.

1) The UE context within the source eNodeB contains information regarding roaming restrictions which were provided either at connection establishment or at the last TA update.

2) The source eNodeB entity configures the UE measurement procedures according to the area restriction information. Measurements provided by the source eNodeB entity may assist the function controlling the UE's connection mobility.

3) Based on measurement results from the UE and the source eNodeB, probably assisted by additional RRM specific information, the source eNodeB decides to handover the UE to a cell controlled by the target eNodeB.

4) The source eNodeB issues a handover Request to the target eNodeB entity passing necessary information to prepare the handover at the target side. The target eNodeB configures the required resources.

5) Admission Control is performed by the target eNodeB to increase the likelihood of a successful handover, if the resources can be granted by target eNodeB.

6) The handover preparation is finished at the target side, information for the UE to reconfigure the radio path towards the target side is passed to the source eNodeB.

7) This step consists of the following sub steps.

a. Before submitting HO Command to the lower layers, the RRC entity in eNB commands the RLC UP entities to stop the DL transmission so that RLC entities shall not submit any RLC PDUs to lower layer. The UL reception could continue. In case receiving entities are UM RLC entities, it will reassemble SDUs and transfer them to the upper layers as soon as all PDUs that contain the SDU have been received. As regards the AM RLC entities, if a Piggybacked ACK/NACK feedback is found in an AMD PDU, it is delivered to the Retransmission buffer & Management Unit at the transmitting side of the AM RLC entity, in order to purge the buffer of positively acknowledged AMD PDUs.

b. The UE is commanded by the source eNB entity to perform the HO, target side radio resource information is contained.

c. On receiving the HO Command the RRC entity in the UE would command the RLC UP entities to stop the UL transmission. The UE shall immediately initiate the L1/L2 signalling in the target eNodeB after this.

d. Since the user plane data transmission is stopped in both directions, the source eNodeB will be able to accurately synchronize the data transmission status between source and target eNB, DL SDU forwarding could start from any point after this.

8) The UE gains synchronisation at the target side.

9) Once the UE has successfully accessed the cell, it sends an indication to the target eNodeB that the handover is completed.

10a) After submitting the handover Complete to lower layer, RRC entity in UE shall command the RLC UP entities to resume the UL UP traffic.

10b) On reception of handover Complete the RRC entity in eNodeB shall command the RLC entities to resume the DL traffic. eNodeB shall start the transmission of the forwarded DL packets received from the source eNodeB.

11) The MME/UPE is informed that the UE has changed cell. The UPE switch the data path to the target side and can release any U-plane/TNL resources towards the source eNodeB.

12) The MME/UPE confirms the handover Complete message with the handover Complete ACK message.

13) The target eNodeB triggers the release of resources at the source side. The target eNodeB can send this message directly after reception of message 9.

14) Upon reception of the Release Resource message, the source eNodeB can release radio and C-plane related resources in relation to the UE context. The source eNodeB should continue to perform data forwarding until an implementation dependent mechanism decides that data forwarding can be stopped and U-plane/TNL resources can be released.

15) If the new cell is member of a new Tracking Area, the UE needs to register with the MME/UPE which in turn updates the area restriction information on the target side.

The precise timings that are indicated above for stopping the data flow help in meeting the following (separate) desiderata we have formulated.

I. Unified Lossless handover mechanism for both real-time and non real-time services.

II. Minimal interruption time for the user plane data.

III. Minimising transmission of duplicate packets by eNodeB and UE.

Desideratum I is met by having the RLC entities which are capable of buffering and forwarding the DL data packets form source to target eNodeB. In the UE the RLC entities may buffer the data packets generated by the application after the UL transmission is stopped till, the UE is switched to the target eNodeB—this requires the UE to provide buffering not present in a conventional UE, but this may not be unduly problematic to implement By implicitly stopping the data flows the source eNodeB could synchronize the data transmission status between source and target eNodeB. This is because the source eNodeB can know accurately which are the DL SDU that need to be transferred to the target eNodeB based on the data in the transmission and retransmission buffer of AM RB and in Transmission buffer of UM RB as this remains static after the data flow is stopped.

Regarding the desideratum II, since there is no explicit (additional) signaling involved for stopping the data flow in the UL as well as DL direction, there will be no increase in the interruption time for the user plane data.

Furthermore, the instance when the DL data is stopped is chosen to be most optimal according to our considerations so as to have minimum interruption time. If the eNodeB continues to schedule DL data, the UE will not be able to successfully receive or acknowledge these data packets as, immediately after receiving the handover command, it would try to synchronise with the target cell. Eventually these packets would have to be forwarded to the target eNodeB and will have to be transmitted again through the target eNodeB resulting in inefficient usage of the air interface bandwidth. Whilst according to conventional thinking it might be argued that for real-time services such as VoIP, stopping the data would be detrimental to the service, we have appreciated that if eNodeB continues to transmit DL packets there is no mechanism that they could be recovered if the UE could not receive them while it was trying to synchronise with the target cell and this might in practice be at least as problematic. However we have appreciated that if data flow is stopped and a packet forwarding mechanism is adopted, there is a possibility to eliminate packet loss in DL although there could be a delayed data packet delivery to the UE which could result in just a single packet being discarded in the worst case. But these could be compensated through the play-out buffer.

Similarly if the UE continues to transmit in the UL while trying to gain synchronisation with the target cell, it may not be able to receive acknowledgement from the source eNodeB and UE would have to again transmit these AM RLC packets in the UL direction to the target eNodeB resulting in inefficient usage of the air interface bandwidth. For the real time services, packets that are transmitted in the UL direction by the UE while it is trying to gain synchronization in the target cell, may get lost due to the bad radio conditions in UL and could not be recovered if the data flow is not stopped. Hence it would be beneficial to avoid any packet loss even for real time services in the UL by stopping the UL data flow during handover execution while the delay could be compensated at the receiving end by play out buffer.

Furthermore if the transmission of data continues both in the UL and DL direction after the handover Command is sent by the eNodeB it would be complicated to synchronize the data transmission status between source and target data eNodeB because of the dynamic nature of the packets in the transmission and retransmission buffers at the source eNodeB and would result in duplicated packets being transmitted again by the target eNodeB in DL and UE in the UL to ensure lossless handover for NRT Services resulting in inefficient usage of the air interface bandwidth. Although there will be inefficient air interface bandwidth usage, the target eNB and UE could ensure lossless HO. However, for real-time services such as VoIP etc using UM mode, data packets transmitted by source and not received correctly at the target, will be lost and cannot be recovered. Hence stopping the data flow for both RT and NRT services in a unified way will help in better resource utilization on the air interface for the NRT Bearers and avoiding the data loss for RT services.

Another advantage of having a definitive time instance for stopping the data flow is that a simplified implicit reordering in the target eNodeB could be achieved if the forwarded DL data packets from the source eNodeB on the X2 interface are transmitted first to the UE followed by the data received from the AGW on S1 interface.

From the above discussion it seems desirable to stop the UL and DL data transmission during the handover execution for both RT and NRT Services to support lossless Inter eNodeB handover, while aiming to keep the interruption time and transmission of duplicate packets to a minimum.

We have disclosed in detail a mechanism for supporting lossless inter eNodeB handover while aiming to keep the interruption time and transmission of duplicate packets to a minimum and simplifying the context transfer and reordering at the target eNodeB.

GLOSSARY OF 3GPP TERMS

LIE—Long Term Evolution (of UTRAN)
eNB—E-UTRANNodeB
UE—User Equipment—mobile communication device
DL—downlink—link from base to mobile
UL—uplink—link from mobile to base
MME—Mobility Management Entity
UPE—User Plane Entity
HO—Handover
RLC—Radio Link Control
RRC—Radio Resource Control
SDU—Service Data Unit
PDU—Protocol Data Unit
TA—Tracking Area
UP—User Plane
TNL—Transport Network Layer
S1 Interface—Interface between aGW and eNB
X2 Interface—Interface between two eNB Referring to FIGS. 6-13, a second exemplary embodiment of this invention will be described hereunder.

Overview

Figure 6:
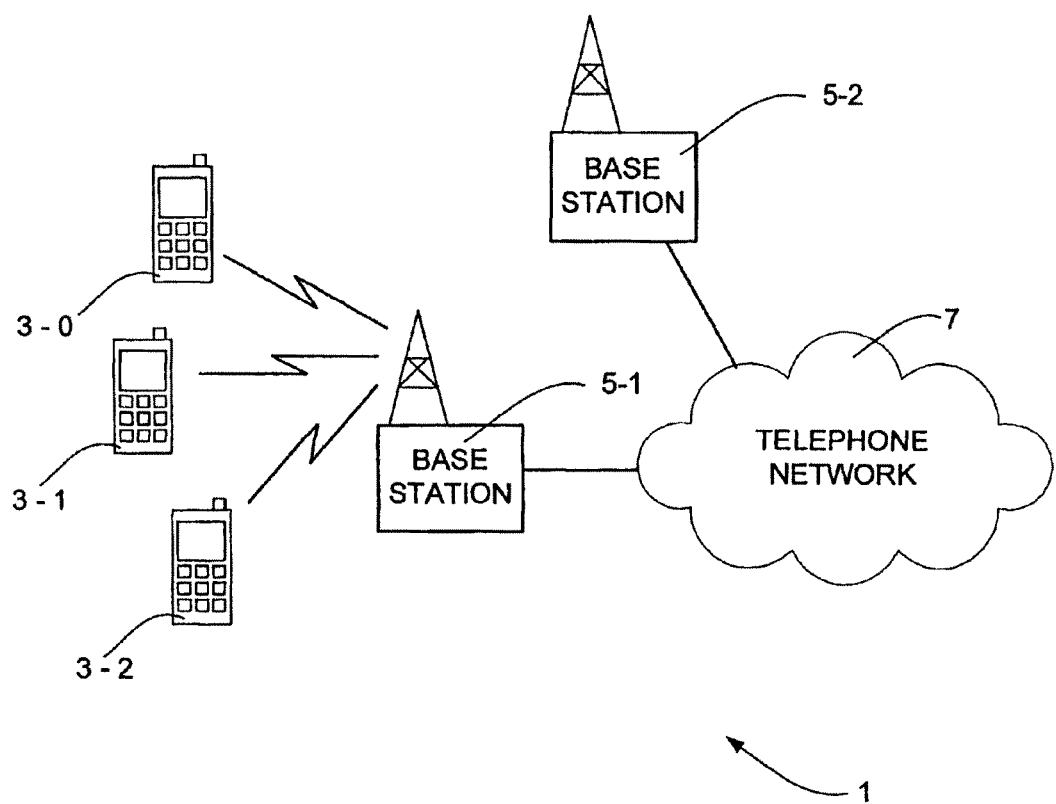
FIG. 6 schematically illustrates a mobile telecommunication system of a type to which a second exemplary embodiment of this invention is applicable.

FIG. 6 schematically illustrates a mobile (cellular) telecommunication system 1 in which users of mobile telephones (MT) 3-0, 3-1, and 3-2 can communicate with other users (not shown) via one of the base stations 5-1 or 5-2 and a telephone network 7. In this embodiment (that is, the second exemplary embodiment of this invention), the base stations 5 uses an orthogonal frequency division multiple access (OFDMA) technique in which the data to be transmitted to the mobile telephones 3 is modulated onto a plurality of sub-carriers. Different sub-carriers are allocated to each mobile telephone 3 depending on the supported bandwidth of the mobile telephone 3 and the amount of data to be sent to the mobile telephone 3. In this embodiment the base stations 5 also allocate the sub-carriers used to carry the data to the respective mobile telephones 3 in order to try to maintain a uniform distribution of the mobile telephones 3 operating across the base station's bandwidth. When a mobile telephone 3 moves from the cell of a source base station (e.g. base station 5-1) to a target base station (e.g. base station 5-2), a handover (HO) procedure (protocol) is carried out in the source and target base stations 5 and in the mobile telephone 3, to control the handover process.

Base Station

Figure 7:
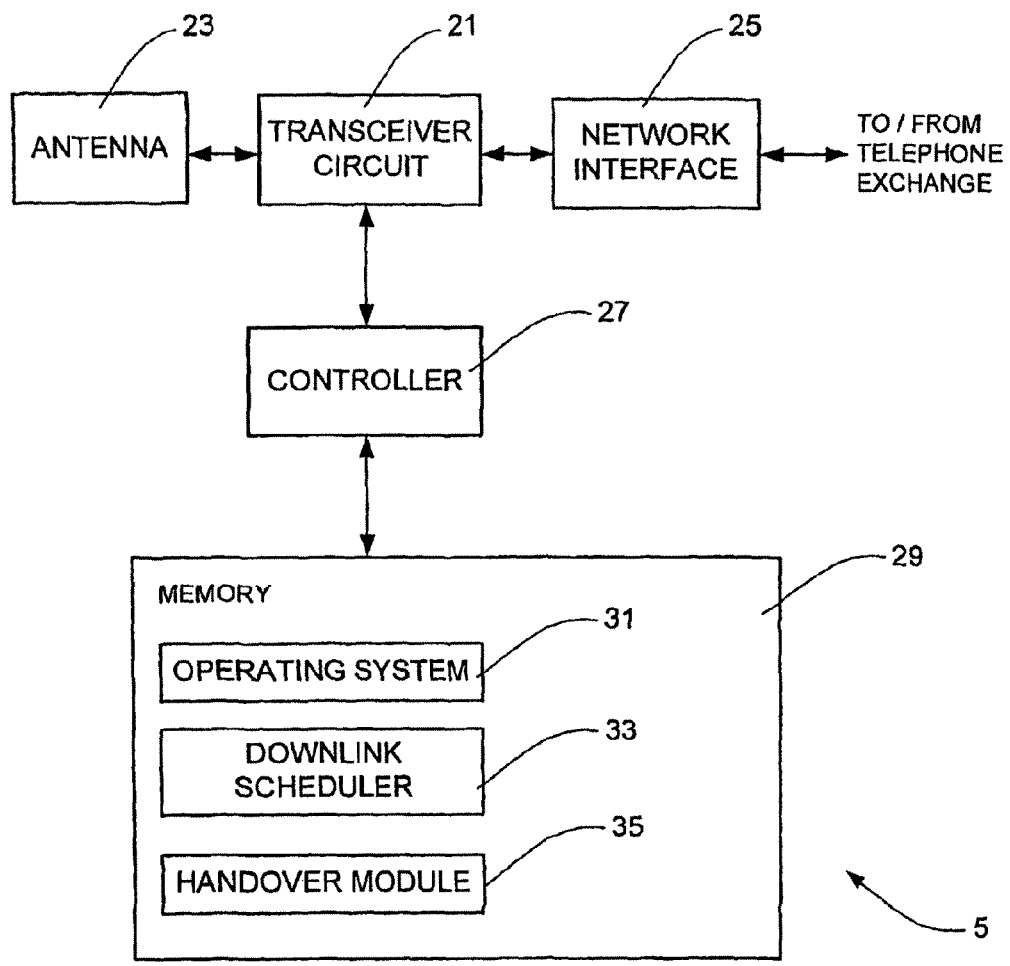
FIG. 7 schematically illustrates a base station forming part of the system shown in FIG. 6.

FIG. 7 is a block diagram illustrating the main components of each of the base stations 5 used in this embodiment. As shown, each base station 5 includes a transceiver circuit 21 which is operable to transmit signals to and to receive signals from the mobile telephones 3 via one or more antennae 23 (using the above described sub-carriers) and which is operable to transmit signals to and to receive signals from the telephone network 7 via a network interface 25. A controller 27 controls the operation of the transceiver circuit 21 in accordance with software stored in memory 29. The software includes, among other things, an operating system 31 and a downlink scheduler 33. The downlink scheduler 33 is operable for scheduling user data packets to be transmitted by the transceiver circuit 21 in its communications with the mobile telephones 3. The software also includes a handover module 35, the operation of which will be described below.

Mobile Telephone

Figure 8:
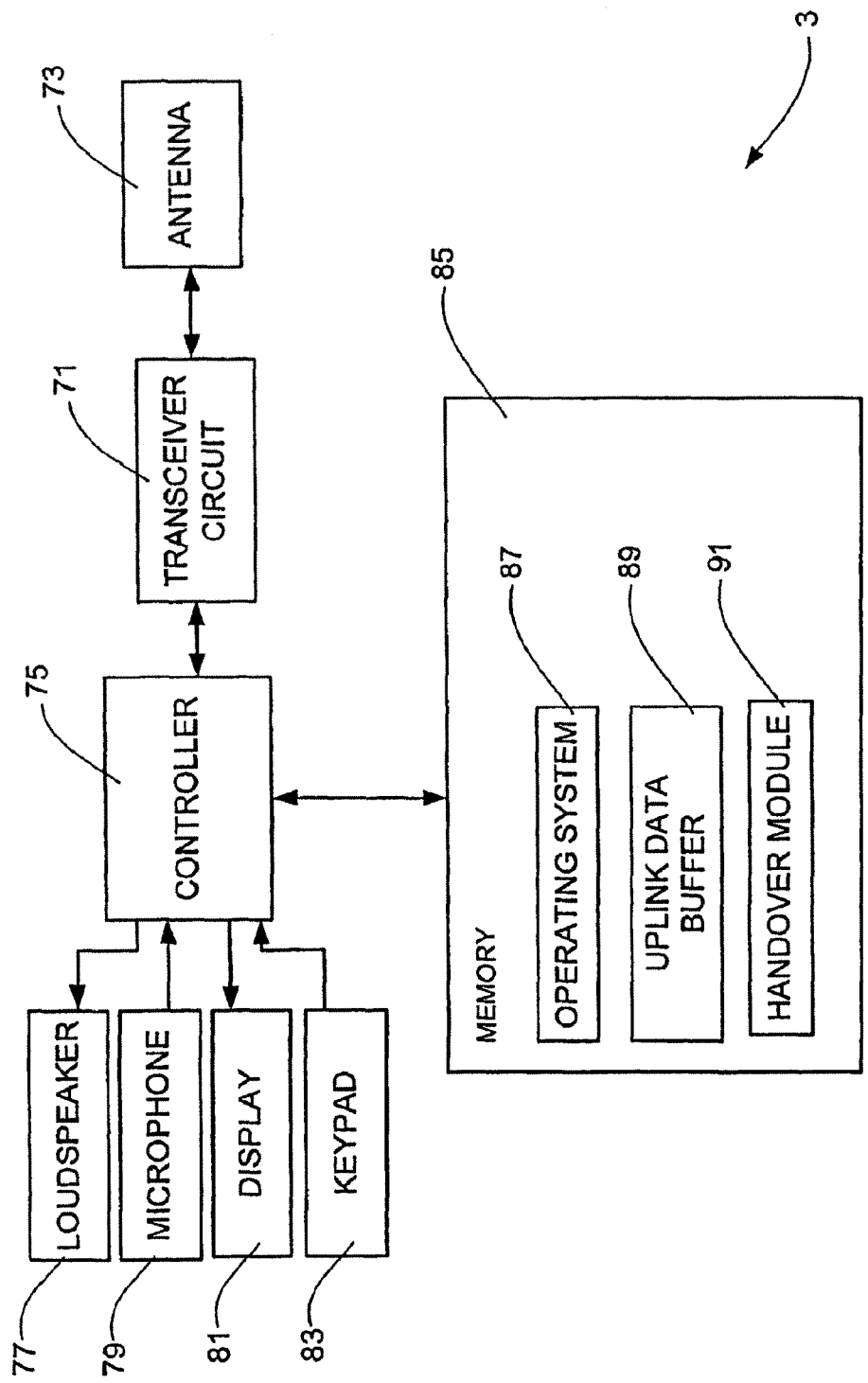
FIG. 8 schematically illustrates a mobile communication device forming part of the system shown in FIG. 6.

FIG. 8 schematically illustrates the main components of each of the mobile telephones 3 shown in FIG. 6. As shown, the mobile telephones 3 include a transceiver circuit 71 that is operable to transmit signals to and to receive signals from the base station 5 via one or more antennae 73. As shown, the mobile telephone 3 also includes a controller 75 which controls the operation of the mobile telephone 3 and which is connected to the transceiver circuit 71 and to a loudspeaker 77, a microphone 79, a display 81, and a keypad 83. The controller 75 operates in accordance with software instructions stored within memory 85. As shown, these software instructions include, among other things, an operating system 87. In this embodiment, the memory also provides uplink data buffers 89. The software for controlling the handover process is provided by a handover module 91, the operation of which will be described below.

In the above description, both the base station 5 and the mobile telephones 3 are described for ease of understanding as having respective discrete handover modules which control the handover procedure when a mobile telephone 3 moves from a source base station to a target base station. Whilst the features may be provided in this way for certain applications, for example where an existing system has been modified to implement the invention, in other applications, for example in systems designed with the inventive features in mind from the outset, the handover features may be built into the overall operating system or code and so a handover module as a discrete entity may not be discernible.

Description of the Related Handover Protocol

The following description will use the nomenclature used in the Long Term Evolution (LIE) of UTRAN. Therefore, the mobile telephone 3 that is changing base stations will be referred to as a UE, the source base station 5-1 will be referred to as the source eNodeB and the target base station 5-2 will be referred to as the target eNodeB. The protocol entities used in LTE have the same names as those used in UMTS except for the Radio Link Control (RLC) entities which, under LTE, are called the Outer ARQ entities. The Outer ARQ entities of LIE have substantially the same (although not identical) functionality to the RLC entities of UMTS.

Figure 9:
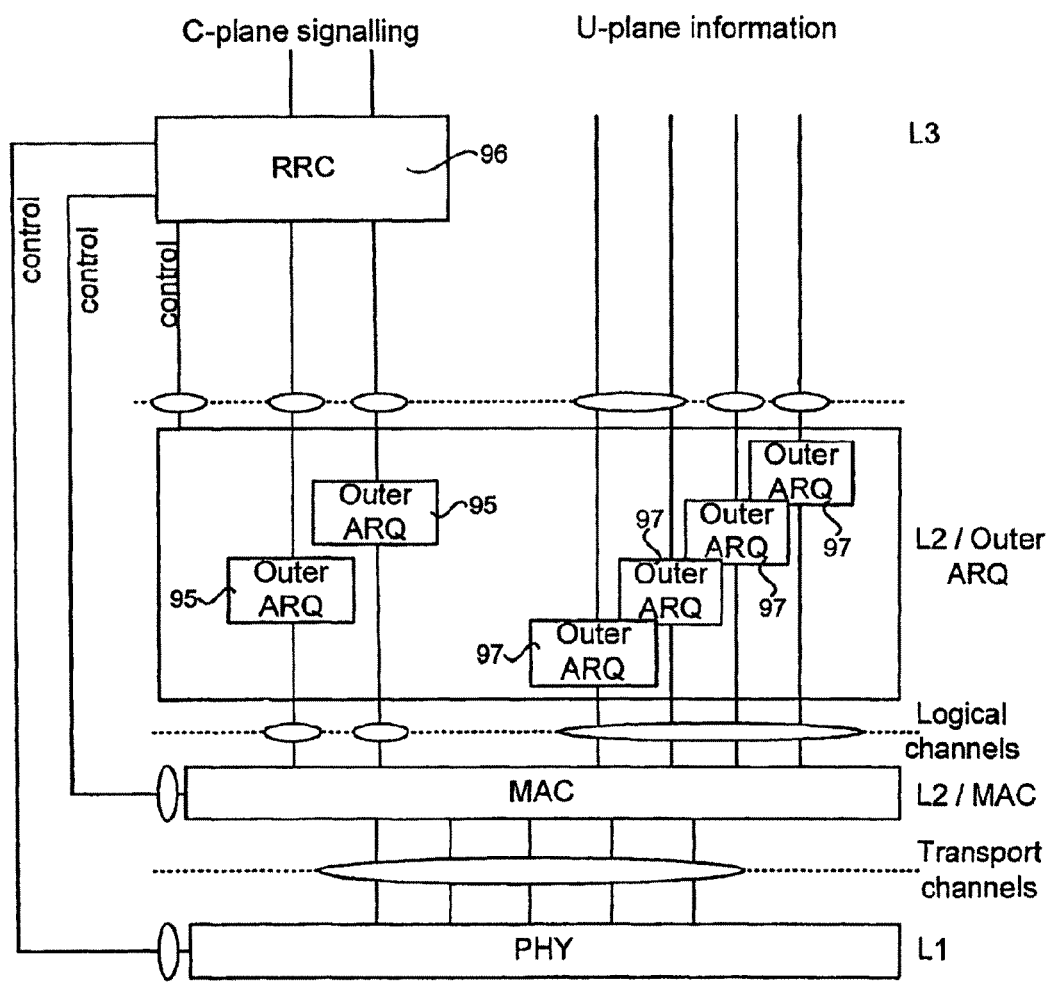
FIG. 9 illustrates part of a protocol stack forming part of the communication software used to control communications between the mobile communication device and the base stations.

FIG. 9 illustrates part of a protocol stack (lower three layers) used in the UE and eNodeBs. The first layer is the physical layer (L1) which is responsible for the actual transmission of the data over the radio communication channel. Above that is the second layer (L2), which is divided into two sub-layers—the Medium Access Control layer (L2/MAC) which is responsible for controlling access to the air interface; and the Outer ARQ layer (L2/OARQ) which is responsible for concatenation and segmentation of data packets, the acknowledgment of packets and the re-transmission of data packets where necessary. Above the second layer is the Radio Resource Control (RRC) layer (L3/RRC) that is responsible for controlling radio resources used in the air interface between the eNodeB and the UE. As shown, the L2/Outer ARQ layer includes a number of Outer ARQ entities 95 used to manage the transmission of C-plane data and a number of Outer ARQ entities 97 used to manage the transmission of U-plane data.

Figure 10:
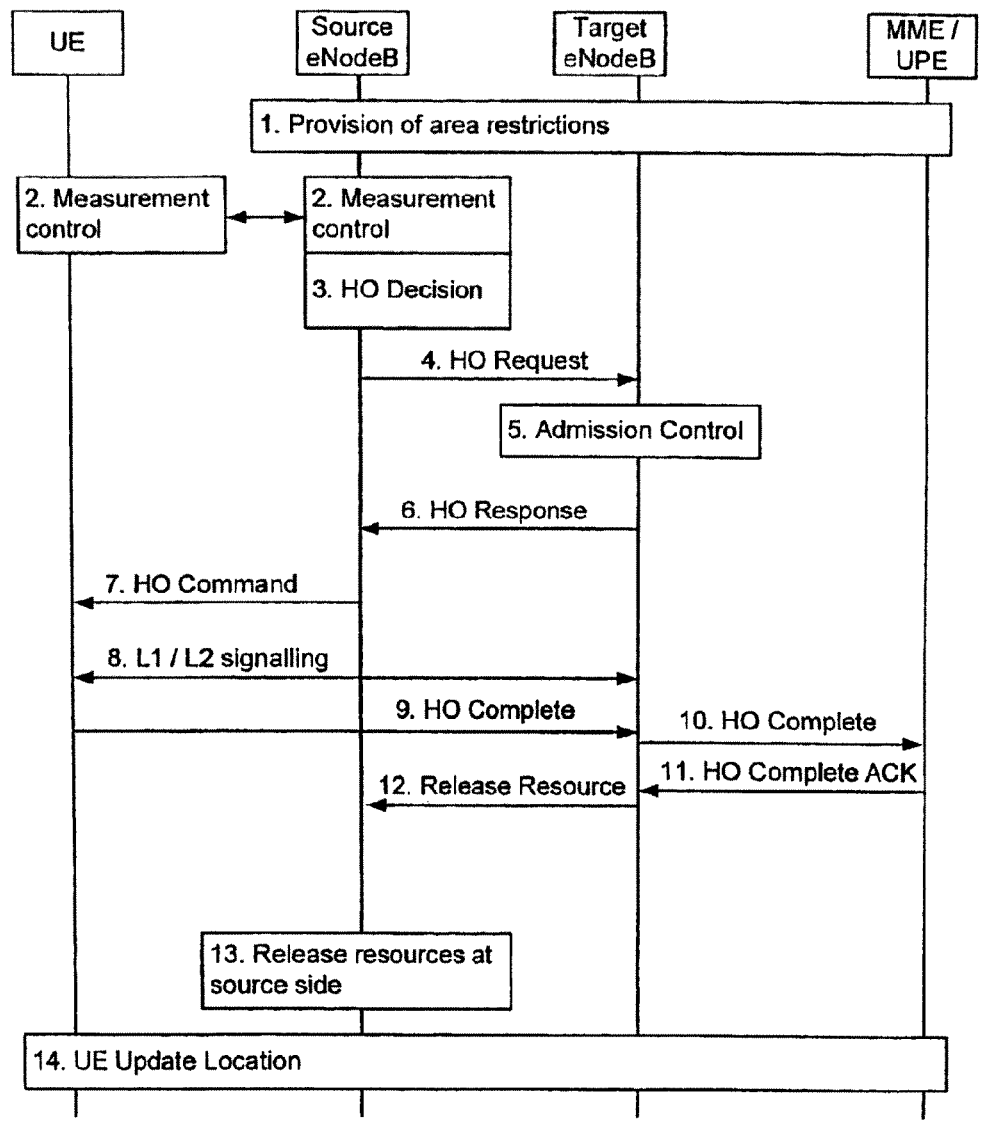
FIG. 10 shows a related handover process.

FIG. 10 illustrates the related control plane (C-plane) signalling sequence for controlling handover as defined in TR 25.912. As shown, the sequence proceeds as follows
1) The UE context within the source eNodeB contains information regarding roaming restrictions which were provided either at connection establishment or at the last TA (Tracking Area) update.
2) The source eNodeB entity configures the UE measurement procedures according to the area restriction information.

Measurements provided by the source eNodeB entity may assist the function controlling the UE's connection mobility.

3) Based on measurement results from the UE and the source eNodeB, probably assisted by additional Radio Resource Management (RRM) specific information, the source eNodeB decides to handover the UE to a cell controlled by the target eNodeB.

4) The source eNodeB issues a handover Request to the target eNodeB entity passing necessary information to prepare the handover at the target side. The target eNodeB configures the required resources.

5) Admission Control is performed by the target eNodeB to increase the likelihood of a successful handover, if the resources can be granted by target eNodeB.

6) The handover preparation is finished at the target side, information for the UE to reconfigure the radio path towards the target side is passed to the source eNodeB.

7) The UE is commanded by the source eNodeB to perform the handover, target side radio resource information is contained in the command.

8) The UE gains synchronisation at the target side.

9) Once the UE has successfully accessed the cell, it sends an indication to the target eNodeB that the handover is completed.

10) The Mobility Management Entity (MME)/User Plane Entity (UPE) (which are two logical entities in the AGW— MME is for C-Plane Management and UPE is for U-Plane management. It is assumed that both of them may be in one node, the AGW are informed that the UE has changed cell. The UPE switches the data path to the target side and can release any User Plane (U-plane) or Transport Network Layer (TNL) resources towards the source eNodeB.

11) The MME/UPE confirms the handover Complete message with the handover Complete ACK message.

12) The target eNodeB sends the sources eNodeB a Release Resource message that triggers the release of resources at the source side. The target eNodeB can send this message directly after reception of message 9.

13) Upon receipt of the Release Resource message, the source eNodeB can release radio and Control Plane (C-plane) related resources in relation to the UE context. The source eNodeB should continue to perform data forwarding to the target eNodeB until an implementation dependent mechanism decides that data forwarding can be stopped and U-plane/TNL resources can be released.

14) If the new cell is a member of a new Tracking Area, the UE needs to register with the MME/UPE which in turn updates the area restriction information on the target side.

The description that follows mainly applies to acknowledge mode (AM) Radio Link Control (RLC), in which receipt of data packets are acknowledged by the receiver, although the Outer ARQ entity (the equivalent of RLC for LTE) may not be identical to the RLC in all aspects. Specifics of unacknowledged mode (UM) Outer ARQ entities employed for real time applications such as VoIP and streaming are also brought out wherever there is a different handling applied as compared to the acknowledge mode entities.

In order to transfer the context and forward the data to support lossless inter eNodeB handover, we have appreciated that it is desirable that the source eNodeB is able to synchronize the data transmission status between itself and the target eNodeB during handover. From this we have concluded that the data flow should desirably be stopped at an appropriate instant in time during the handover execution phase considering that the interruption time for the User Plane data is minimal. However, fulfilling this desired requirement is not straightforward as stopping the data transmission through additional signalling would be problematic as it would increase the overall handover time. We have appreciated that it is possible implicitly to stop the data transmission in (one or both, preferably both) the source eNodeB and UE at the time of handover execution, by modifying the related approach (which is carried out solely in the C-plane) to build in some "realisation" of the handover process in the User plane data transfer process. A further desirable feature is that, whether, Outer ARQ Service Data Units (SDUs) or Outer ARQ Protocol Data Units (PDUs) based forwarding is adopted, the number of duplicated packets transmitted over the air either by the target eNodeB or by the UE is minimised.

Figure 11:
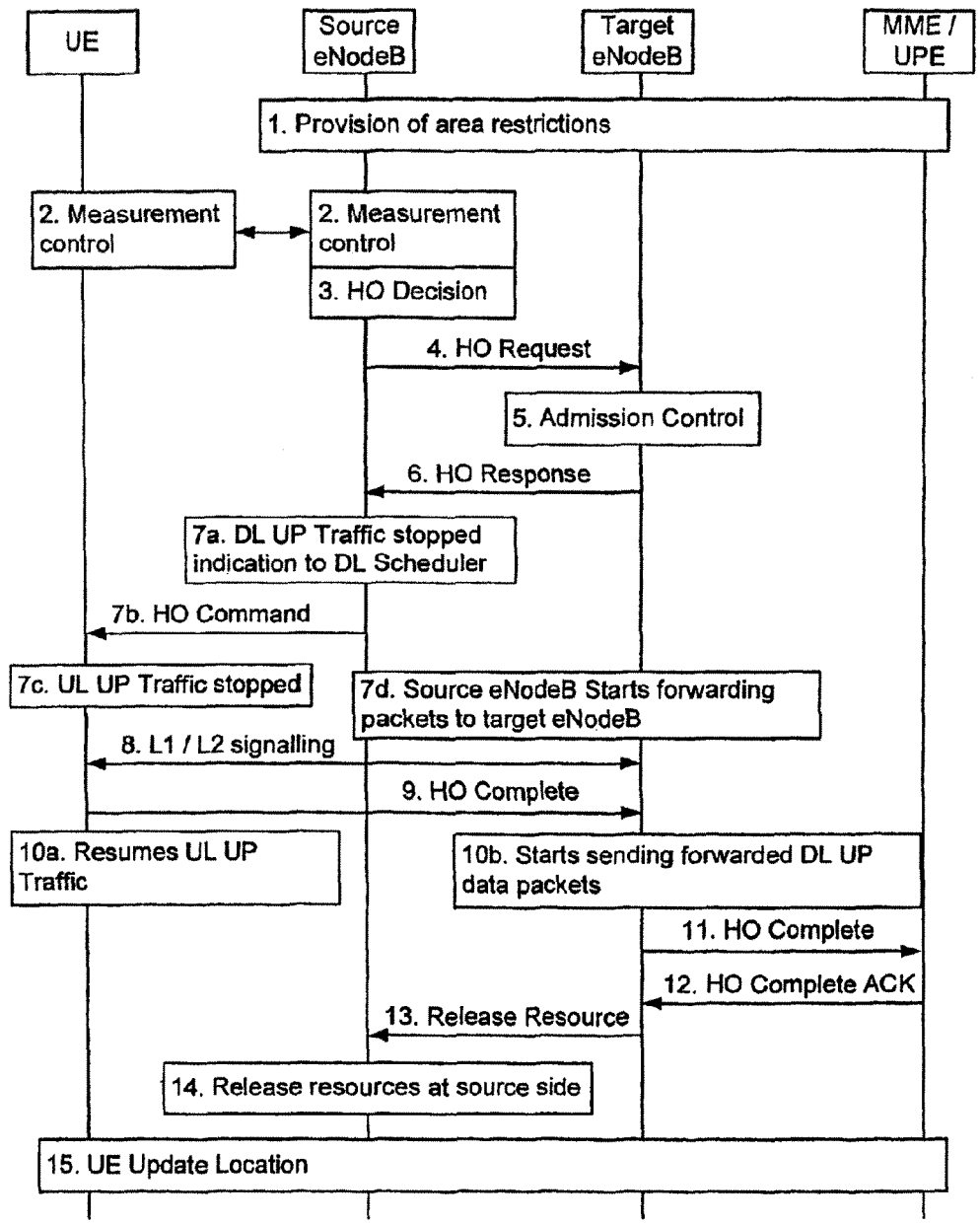
FIG. 11 shows a modified handover process.

The inventor has proposed that the signalling sequence in FIG. 10 be modified as shown in FIG. 11 which shows timings when it is proposed to stop the U-plane data transmission in the Downlink (DL) and the Uplink (UL), together with the details of the modified sequences described. The following description explains how this approach of stopping the data flow facilitates achieving a fast lossless handover for LTE.

Referring to FIG. 11, information flow for Intra-LTE-Access Mobility Support is described.

1) The UE context within the source eNodeB contains information regarding roaming restrictions which were provided either at connection establishment or at the last TA update.

2) The source eNodeB entity configures the UE measurement procedures according to the area restriction information. Measurements provided by the source eNodeB entity may assist the function controlling the UE's connection mobility.

3) Based on measurement results from the UE and the source eNodeB, probably assisted by additional RRM specific information, the source eNodeB decides to handover the UE to a cell controlled by the target eNodeB.

4) The source eNodeB issues a handover Request to the target eNodeB entity passing necessary information to prepare the handover at the target side. The target eNodeB configures the required resources.

5) Admission Control is performed by the target eNodeB to increase the likelihood of a successful handover, if the resources can be granted by target eNodeB.

6) The handover preparation is finished at the target eNodeB, information for the UE to reconfigure the radio path towards the target eNodeB is passed to the source eNodeB.

7) This step consists of the following sub steps.

a. Before submitting the HO Command to the lower protocol layers, the Radio Resource Control (RRC) entity 96 in the source eNodeB commands the Outer ARQ User Plane (UP) entities 97 to stop the DL transmission so that these Outer ARQ entities 97 shall not submit any Outer ARQ PDUs to the lower protocol layer. The UL reception should continue. In case receiving packets are UM Outer ARQ PDUs, the Outer ARQ entity will reassemble the SDUs and transfer them to the upper layers as soon as all PDUs that contain the SDU have been received. As regards the AM Outer ARQ PDUs, if a Piggybacked ACK/NACK feedback is found in an AMD PDU, it is delivered to the Retransmission buffer & Management Unit at the transmitting side of the AM Outer ARQ entity, in order to purge the buffer of positively acknowledged AMD PDUs.

b. The UE is commanded by the source eNodeB RRC entity 96 to perform the HO, target side radio resource information is contained in the command.

c. On receiving the HO Command the RRC entity 96 in the UE commands the outer ARQ U-plane entities to stop the UL transmission. The UE shall immediately initiate the L1/L2 signalling in the target eNodeB after this.

d. Since the user plane data transmission is stopped in both directions, the source eNodeB will be able to accurately synchronize the data transmission status between source and target eNodeBs, and DL SDU forwarding (from Source eNodeB to target eNodeB) can start from any point after this.

8) The UE gains synchronisation at the target side.

9) Once the UE has successfully accessed the cell, it sends an indication to the target eNodeB that the handover is completed.

10a) After submitting the handover Complete to the lower layer, the RRC entity 96 in the UE commands the Outer ARQ U-plane entities 97 to resume the UL U-plane traffic.

10b) On reception of handover Complete, the RRC entity 96 in the target eNodeB commands the Outer ARQ U-plane entities 97 to resume the DL traffic. The target eNodeB starts the transmission of the forwarded DL packets received from the source eNodeB.

11) The MME/UPE is informed that the UE has changed cell. The UPE switches the data path to the target eNodeB and can release any U-plane/TNL resources towards the source eNodeB.

12) The MME/UPE confirms the handover Complete message to the target eNodeB with the handover Complete ACK message.

13) The target eNodeB triggers the release of resources at the source side. The target eNodeB can send this message directly after reception of message 9.

14) Upon reception of the Release Resource message, the source eNodeB releases radio and C-plane related resources in relation to the UE context.

The source eNodeB continues to perform data forwarding until an implementation dependent mechanism decides that data forwarding can be stopped and U-plane/TNL resources can be released.

15) If the new cell is a member of a new Tracking Area, the UE needs to register with the MME/UPE which in turn updates the area restriction information on the target eNodeB.

The precise timings that are indicated above for stopping the data flow help in meeting the following (separate) desiderata we have formulated.

I. Unified Lossless handover mechanism for both real-time and non real-time services.

II. Minimal interruption time for the user plane data.

III. Minimising transmission of duplicate packets by eNodeB and UE.

Desideratum I is met by having Outer ARQ entities 97 which are capable of buffering and forwarding the DL data packets form source to target eNodeB. In the UE the Outer ARQ entities 97 may buffer the data packets generated by the application after the UL transmission is stopped until the UE is switched to the target eNodeB—this requires the UE to provide buffering not present in a conventional UE, but this may not be unduly problematic to implement. By implicitly stopping the data flows the source eNodeB can synchronize the data transmission status between source and target eNodeB. This is because the source eNodeB can know accurately which are the DL SDUs that need to be transferred to the target eNodeB based on the data in the transmission and retransmission buffer of the AM Radio Bearer (RB) and in the Transmission buffer of UM RB as this remains static after the data flow is stopped.

Regarding the desideratum II, since there is no explicit (additional) signaling involved for stopping the data flow in the UL as well as the DL directions, there will be no increase in the interruption time for the user plane data.

Furthermore, the instance when the DL data is stopped is chosen to be most optimal according to our considerations so as to have minimum interruption time. If the source eNodeB continues to schedule DL data, the UE will not be able to successfully receive or acknowledge these data packets as, immediately after receiving the handover command, it would try to synchronise with the target cell. Eventually these packets would have to be forwarded to the target eNodeB and will have to be transmitted again through the target eNodeB resulting in inefficient usage of the air interface bandwidth. Whilst according to conventional thinking it might be argued that for real-time services such as VoIP, stopping the data would be detrimental to the service, we have appreciated that if the source eNodeB continues to transmit DL packets there is no mechanism by which they could be recovered if the UE could not receive them while it is trying to synchronise with the target cell and this might, in practice, be at least as problematic. However we have appreciated that if data flow is stopped and a packet forwarding mechanism is adopted, there is a possibility to eliminate packet loss in the DL, although there could be a delayed data packet delivery to the UE which could result in just a single packet being discarded in the worst case. But this could be compensated through the play-out buffer.

Similarly if the UE continues to transmit in the UL while trying to gain synchronisation with the target cell, it may not be able to receive acknowledgements from the source eNodeB and the UE would have to again transmit these AM packets in the UL direction to the target eNodeB resulting in inefficient usage of the air interface bandwidth. For real time (RT) services, packets that are transmitted in the UL direction by the UE while it is trying to gain synchronisation in the target eNodeB, may get lost due to bad radio conditions in the UL and could not be recovered if the data flow is not stopped. Hence it would be beneficial to avoid any packet loss even for real time services in the UL by stopping the UL data flow during handover execution while the delay could be compensated at the receiving end by the play out buffer.

Furthermore if the transmission of data continues both in the UL and DL directions after the handover Command is sent by the source eNodeB, it would be complicated to synchronize the data transmission status between source and target eNodeBs because of the dynamic nature of the packets in the transmission and retransmission buffers at the source eNodeB and would result in duplicated packets being transmitted again by the target eNodeB in the DL and by the UE in the UL to ensure lossless handover for non-real time (NRT) Services resulting in inefficient usage of the air interface bandwidth. However, for real-time services such as VoIP etc using UM mode, data packets transmitted by the source eNodeB and not received correctly at the target eNodeB, will be lost and cannot be recovered. Hence stopping the data flow for both RT and NRT services in a unified way will help in better resource utilization on the air interface for the NRT Bearers and will avoid data loss for RT services.

Another advantage of having a definitive time instant for stopping the data flow is that a simplified implicit reordering of the data packets in the target eNodeB can be achieved if the forwarded DL data packets from the source eNodeB on the X2 interface are transmitted first to the UE followed by the data received from the Access Gateway (AGW) on the S1 interface.

From the above discussion it seems desirable to stop the UL and DL data transmission during the handover execution for both RT and NRT Services to support lossless Inter eNodeB handover, while aiming to keep the interruption time and transmission of duplicate packets to a minimum.

Outer ARQ Requirements

In order to support the above lossless/seamless handover the outer ARQ entities should have the following requirements.

SDU Level Buffer Management

The re-establishment of a new link layer (L2) connection with the target eNodeB during inter eNodeB handover causes the Outer ARQ entities of the source eNodeB as well as the UE to flush out the Outer ARQ PDUs from the outstanding transmit and re-transmit buffers. The flushing of outstanding radio frames produces noticeable impact on the performance of the end-to-end application.

Figure 12:
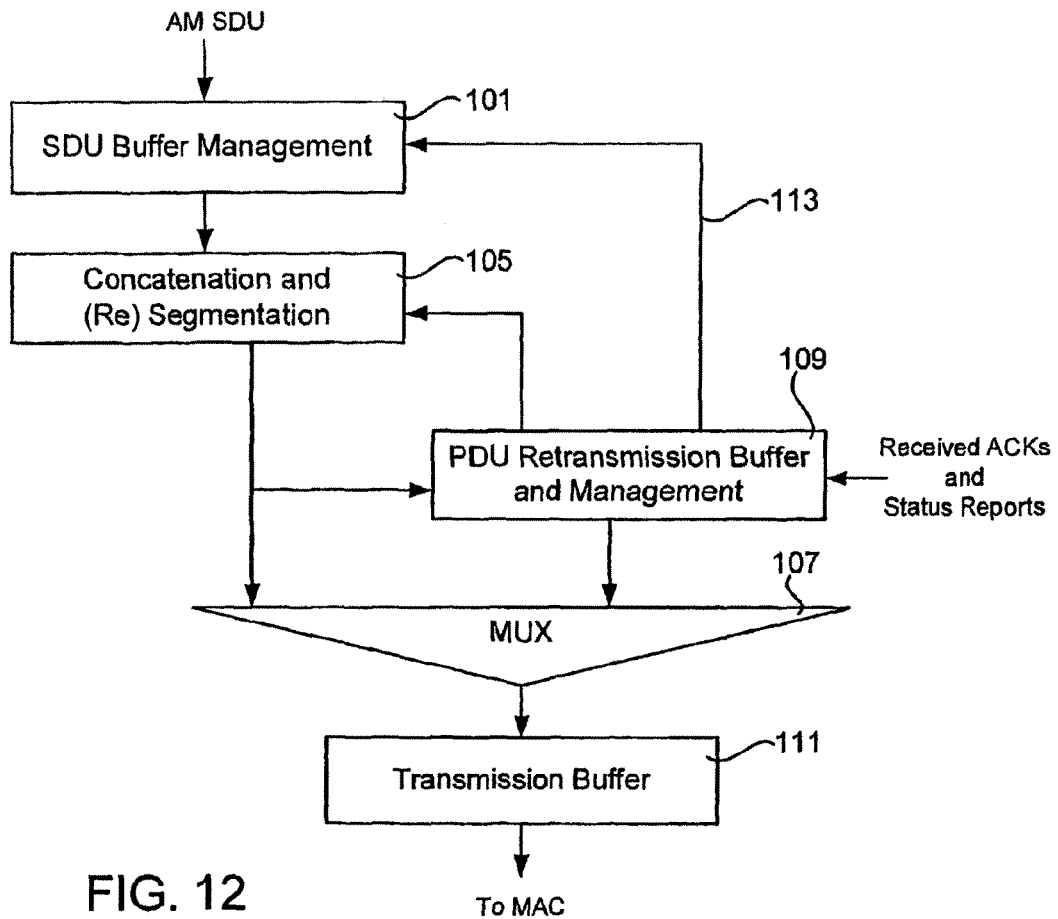
FIG. 12 illustrates the operation of the outer ARQ entity for managing the buffering of acknowledge mode data packets during the handover process.
Figure 13:
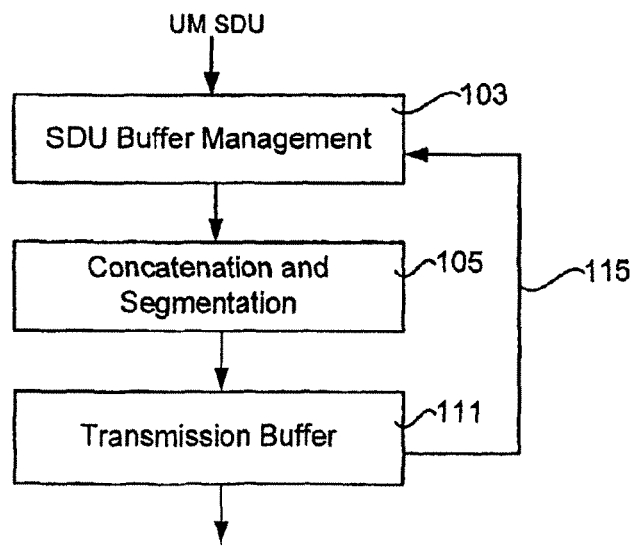
FIG. 13 illustrates the operation of the outer ARQ entity for managing the buffering of unacknowledge mode data packets during the handover process.

In this embodiment, in order to minimize or eliminate packet loss during intra-LTE inter eNodeB handover, the outer ARQ entity 97 maintains a new SDU buffer management entity for both AM and UM mode data packets. FIG. 12 illustrates this new SDU buffer management entity 101 for AM mode data packets and FIG. 13 illustrates this new SDU buffer management entity 103 for UM mode data packets. As shown in FIG. 12, the SDU buffer management entity 101 buffers (stores a copy of) each incoming AM SDU before sending it to the concatenation and segmentation entity 105 within the outer ARQ layer. The segmented packets (PDUs) are then output to a multiplexer 107 and at the same time copied into a PDU retransmission buffer and management entity 109. A PDU received from the concatenation and segmentation entity 105 or a PDU requiring re-transmission is then passed through the multiplexer 107 to the transmission buffer 111 for submission to the lower layer (L2/MAC). Acknowledgements received back from the receiving terminal are received by the PDU retransmission buffer and management entity 109 and used to control the retransmission of PDUs that are not acknowledged. Once the PDU retransmission buffer and management entity 109 can infer that all the segments belonging to a SDU have been successfully delivered to the ARQ layer of the peer device, it provides a feedback trigger (identifying that SDU) to the SDU buffer management entity 101, through a new interface 113. For example, the PDU Retransmission and Buffer management entity 109 in the eNodeB will send this feedback trigger when it is able to decide that all the segments belonging to a SDU have been successfully received by the ARQ layer in the receiving UE. Upon receiving this feedback trigger, the SDU buffer management entity 101 uses the information contained in the feedback trigger to flush (remove) the corresponding SDU stored in its buffer Similarly, as illustrated in FIG. 13, incoming UM mode data packets are copied and buffered by the SDU Buffer Management entity 103 and then passed onto the concatenation and segmentation entity 105 for concatenation and segmentation into PDUs. The PDUs are then output to the transmission buffer 111 for submission to the lower layer (L2/MAC). Once all the PDUs belonging to a SDU have been submitted to the MAC for transmission, the transmission buffer 111 sends a feedback trigger (over a new interface 115) identifying that SDU to the SDU buffer management entity 103. In response, the SDU buffer management entity 103 flushes that SDU from its buffer.

When stopping the ARQ entity during HO, the PDU retransmission and buffer management entity 109 for AM data and the transmission buffer entity 111 for UM data would also send the feedback to the SDU buffer management entity 101/103 if an SDU was transmitted just before the DL transmission is stopped. In this way, the SDU buffer management entity 101/103 can update its SDU buffers so that they contain only those SDUs that have not yet been transmitted in full to the UE.

On the network side, the SDU buffer management entity 101/103 in the source eNodeB forwards only the undelivered DL SDUs (which are stored in the SDU buffer management entity 101/103) to the target eNodeB to ensure zero downlink packet loss and minimising transmission of duplicate packets. The SDU buffer management entity 101/103 in the source eNodeB starts to forward the buffered packets to the target eNodeB (through the tunnel established over the X215 interface), when it receives a command to do so from the RRC layer (L3).

At the UE, the SDU buffer management entity 101/103 will send the buffered packets on resumption of data flow in the UL after HO is completed (i.e. after sending the HO Complete message), to the target eNodeB to ensure zero uplink packet loss and to minimise transmission of duplicate packets.

Unidirectional Stopping of the Outer ARQ Entities

Since data transmission is being stopped in the source eNodeB and in the UE at the time of handover execution, it needs to be emphasised that suspending the user plane data transfer in both directions (as in a conventional REL 6 RLC entity) would result in data loss as the data packets in flight will be discarded by the RLC entity that has been stopped. Hence for a LTE system where there will be hard handovers, the outer ARQ entity (RLC) should stop transmissions but continue to receive packets to avoid any data loss.

Before submitting the HO Command to the lower layers, the RRC entity 96 in the source eNodeB commands the Outer ARQ U-plane entities to stop the DL transmission. The UL reception should continue. In case receiving PDUs are UM Outer ARQ PDUs, the Outer ARQ entity will reassemble SDUs and transfer them to the upper layers as soon as all PDUs that contain the SDU have been received. As regards the AM Outer ARQ PDUs, if a Piggybacked ACK/NACK feedback is found in an AMD PDU, it is delivered to the Retransmission buffer & Management entity 109 at the transmitting side of the AM Outer ARQ entity, in order to purge the buffer of positively acknowledged AMD PDUs. Similarly on receiving the HO Command the RRC entity 96 in the UE commands the Outer ARQ U-plane entities to stop the UL transmission. This functionality therefore requires a primitive (command) from the RRC entity 96 which will indicate the direction in which the data flow needs to be stopped.

Sending STAUS PDU Before Stopping of the Outer ARQ Entities

In order to transfer the context and forward the data to support lossless inter eNodeB HO, the source eNodeB synchronizes the data transmission status between itself and the target data eNodeB during HO. This is facilitated by stopping the data flow at an appropriate instant in time during the HO execution phase, considering that the interruption time for the user plane data is minimal. In one embodiment the Outer ARQ entity in the source eNodeB and in the UE sends the other a status report (indicating what that device has received successfully) before stopping the data flow in the appropriate direction. This status message may be a simplified report indicating only what the device has received. This allows the source eNodeB and the UE to get know the exact data transmission status (i.e. what the other party has received and therefore what still has to be sent) before stopping the transmission during the HO execution. Therefore, after the HO the data transmission can resume without the need to transmit any duplicated packets over the air interface.

This functionality requires a primitive (command) from the RRC entity 96 which instructs the outer ARQ entities 97 to send a Status PDU before stopping the data transmission.

GLOSSARY OF 3GPP TERMS

LTE—Long Term Evolution (of UTRAN)
eNodeB—E-UTRAN Node B
AGW—Access Gateway

UE—User Equipment—mobile communication device
DL—downlink—link from base to mobile
UL—uplink—link from mobile to base
AM—Acknowledge Mode
UM—Unacknowledge Mode
MME—Mobility Management Entity
UPE—User Plane Entity
HO—Handover
RLC—Radio Link Control
RRC—Radio Resource Control
RRM—Radio Resource Management
SDU—Service Data Unit
PDU—Protocol Data Unit
TA—Tracking Area
U-plane—User Plane
TNL—Transport Network Layer
S1 Interface—Interface between Access Gateway and eNodeB
X2 Interface—Interface between two eNodeB The following is a detailed description of the way in which the present inventions may be implemented in the currently proposed 3GPP LIE standard. Whilst various features are described as being essential or necessary, this may only be the case for the proposed 3GPP LIE standard, for example due to other requirements imposed by the standard. These statements should not, therefore, be construed as limiting the present invention in any way.

1. Introduction

The signalling flow for the control plane signalling with coordination between the RRC signaling and pausing/resuming of the U-plane data to achieve Lossless/Seamless Intra-LTE Handover is discussed in [1]. To achieve the lossless/seamless handovers there are certain requirements that need to be fulfilled by the outer ARQ entities.

In this contribution we discuss these Outer ARQ requirements to support Lossless/Seamless HO for Intra LTE Handover.

2. Discussion

In order to support lossless/seamless handover following requirements needs to be supported by the outer ARQ entities.

2.1 SDU Level Buffer Management

The re-establishment of a new link layer connection with target eNB during inter eNB handover causes the outer ARQ layers of source eNB as well as the UE to flush out the RLC PDUs from the outstanding transmit and re-transmit buffers. The flushing of outstanding radio frames produces noticeable impact on the performance of end-to-end application.

In order to minimize or eliminate packet loss during intra-LTE inter eNB handover, it is necessary that the outer ARQ entity maintains a new SDU buffer management entity for both the AM and UM mode as shown in FIG. 6. The SDU buffer management entity buffers the incoming PDCP packet before sending that to segmentation entity within the outer ARQ layer.

The feedback form the PDU Retransmission and Buffer management entity to the SDU buffer management entity in the AM mode, through the new interface 113 in FIG. 12, will be sent once it can infer that all the segments belonging to a SDU has been successfully delivered to the ARQ layer of the peer device. For example, eNB PDU Retransmission and Buffer management entity will send this trigger when it is able to decide that all the segments belonging to a SDU has been successfully received by the UE ARQ layer. SDU buffer management entity uses this information to flush the SDU stored in its buffer when indicated by the PDU Retransmission and Buffer management entity trigger.

Similarly, for UM mode outer ARQ entity, Transmission Buffer entity would send a feedback, through the new interface 115 shown in FIG. 13, to SDU buffer management entity once all the PDUs belonging to a SDU has been submitted to the MAC for transmission. SDU buffer management entity shall flush the buffer accordingly.

When stopping the ARO entity during HO, the PDU Retransmission and Buffer management entity for AM and Transmission Buffer entity for UM would also send the feedback to the SDU buffer management entity so that it could update its SDU buffers.

On the network side, SDU buffer management entity shall forward only the undelivered DL SDU form the source eNB to target eNB to ensure zero downlink packet loss and minimising transmission of duplicate packets. A new primitive form RRC layer needs to be defined to indicate to the SDU buffer management entity to start forwarding the buffered packet from source eNB to the target eNB through the tunnel established over the X2 interface.

At the UE, the SDU buffer management entity will send the buffered packet on resumption of data flow in the UL after HO is completed (i.e. after sending HO Complete), through the target eNB to ensure zero uplink packet loss and minimising transmission of duplicate packets 2.2 Unidirectional Stopping of the Outer ARQ Entities.

Since we need to stop the data transmission in the source eNB and UE at the time of handover execution, it needs to be emphasised that suspending the user plane data transfer in both direction as in conventional REL 6 RLC entity would result in data loss as the data packets in flight will be discarded by the RLC entity that has been stopped. Hence for a LTE system where there will be hard handovers, it is necessary that the Outer ARQ entity stops transmissions but continue to receive the packets to avoid any data loss.

Before submitting HO Command to the lower layers, the RRC entity in eNB would command the Outer ARQ ENTITY UP entities to stop the DL transmission. The UL reception could continue. In case receiving entities are UM Outer ARQ ENTITY entities, it will reassemble SDUs and transfer them to the upper layers as soon as all PDUs that contain the SDU have been received. As regards the AM Outer ARQ ENTITY entities, if a Piggybacked ACK/NACK feedback is found in an AMD PDU, it is delivered to the Retransmission buffer & Management Unit at the transmitting side of the AM Outer ARQ ENTITY entity, in order to purge the buffer of positively acknowledged AMD PDUs. Similarly on receiving the HO Command the RRC entity in the UE would command the Outer ARQ ENTITY UP entities to stop the UL transmission.

This functionality would therefore require a primitive from RRC which will indicate the direction in which the data flow needs to be stopped.

2.2 Sending STAUS PDU Before Stopping of the Outer ARQ Entities

In order to transfer the context and forward the data to support lossless inter eNB HO, it is necessary that the source eNB is able to synchronize the data transmission status between itself and target data eNB during HO. This would in turn require that the data flow should be stopped at appropriate instant in time during HO execution phase considering that the interruption time for the user plane data is minimal. If the Outer ARQ entity sends a status report before stopping the data flow in a particular direction, it would facilitate the source eNB and the UE to get know the exact data transmission status before stopping the transmission during HO execution. After the HO the data transmission can resume without the need to transmit any duplicated packets over the air interface.

This functionality would require a primitive which would indicate the outer ARQ entities to send a Status PDU before stopping a data.

3. Conclusion

In this paper, we discuss in detail the outer ARQ functionality needed for supporting the lossless/seamless inter eNB handover while aiming to keep transmission of duplicate packet to a minimum. It is proposed to capture the Outer ARQ functionality requirement from the discussion and include it in the Stage 2 TS form this paper.

4. Reference

[1] R2-060XXX Intra LTE Lossless/Seamless Handover

[2] R2-062725, E-UTRAN Stage 2 v004

The invention claimed is:

1. A method, performed in a long term evolution (LTE) communications network, of facilitating a handover of a mobile communication device in the LTE communications network from a source node in the LTE communications network to a target node in the LTE communications network, the method comprising:
    receiving, in the target node, in the LTE communications network, at least one of Acknowledge Mode (AM) data and Unacknowledge Mode (UM) data forwarded from the source node via an X2 LTE interface, the data received via the X2 interface comprising downlink service data units (SDUs);
    receiving, in the target node, in the LTE communications network, at least one of the Acknowledge Mode (AM) data and the Unacknowledge Mode (UM) data, via an S1 LTE interface, the data received via the S1 interface comprising downlink SDUs;
    prioritizing the downlink SDUs in the target node, in the LTE communications network, based on the LTE interface from which the SDUs are received such that SDUs from the X2 interface are prioritized to be sent before sending SDUs from the S1 interface;
    sending, when said received data comprises the UM data, the prioritized SDUs of the UM data from the target node in the LTE communications network to the mobile communication device in the LTE communications network, in accordance with said prioritizing, after completion of the handover from the source node to the target node in the LTE communications network;
    determining, when said received data comprises said AM data, whether the downlink SDUs of said AM data have or have not been acknowledged by the mobile communication device; and
    retransmitting, when the downlink SDUs of said AM data are determined not to have been acknowledged by the mobile communication device, the prioritized SDUs of said AM data, from the target node to the mobile communication device, in accordance with said prioritizing.

2. A method according to claim 1, wherein the prioritizing the downlink SDUs is performed such that the data packets received from the X2 LTE interface are sent to the mobile communication device by the target node before data packets received from the S1 LTE interface.

3. A non-transitory computer-readable storage medium encoded with a computer program, comprising instructions which, when executed by one or more processors of a telecommunications network, cause the one or more processors to perform a method according to claim 1.

4. A method according to any of claim 1, performed by a base station of a mobile telecommunication network.

5. A method according to claim 1, wherein the S1 LTE interface is different from the X2 LTE interface.

6. A method according to claim 1, further comprising receiving a handover request and sending a handover response handover completion.

7. A method according to claim 1, wherein, during the handover of the mobile communication device, the SDUs are forwarded to the target node.

8. A method according to claim 7, wherein the SDUs are forwarded to the target node in dependence upon stored SDUs.

9. A method according to claim 8, further comprising receiving a handover response from the target node and in response stopping forwarding the stored SDUs to the target node.

10. A target node of a long term evolution (LTE) communications network, the target node comprising:
    an X2 LTE interface for receiving, during a handover of a mobile communication device of the LTE communications network from a source node of the LTE communications network to the target node of the LTE communications network, at least one of Acknowledge Mode (AM) data and Unacknowledge Mode (UM) data from the source node of the LTE communications network, the data received via the X2 interface comprising downlink service data units (SDUs);
    an S1 LTE interface for receiving at least one of the Acknowledge Mode (AM) data and the Unacknowledge Mode (UM) data, the data received via the S1 interface comprising downlink SDUs;
    a controller arranged to prioritize, in the LTE communications network, the SDUs based on the LTE interface from which the SDUs are received such that SDUs from the X2 interface are prioritized to be sent before sending SDUs from the S1 interface; and
    a transmitter arranged to send, when said received data comprises said UM data, the prioritized SDUs of said UM data from the target node in the LTE communications network to the mobile communication device of the LTE communications network, in accordance with said prioritizing, after completion of the handover from the source node to the target node in the LTE communications network,
    wherein said controller is further arranged to determine, when said received data comprises said AM data, whether the downlink SDUs of said AM data have or have not been acknowledged by the mobile communication device, and
    wherein said transmitter is further arranged to retransmit, when the downlink SDUs of said AM data are determined not to have been acknowledged by the mobile communication device, the prioritized SDUs of said AM data, from the target node to the mobile communication device, in accordance with said prioritizing.

11. A target node according to claim 10, wherein the S1 LTE interface is different from the X2 LTE interface.

12. A target node according to claim 10, wherein, during the handover of the mobile device, the SDUs are forwarded to the target node.

13. A target node according to claim 12, wherein the SDUs are forwarded to the target node in dependence upon stored SDUs.

14. A target node according to claim 13, wherein after receiving a handover response from the target node, forwarding the stored SDUs to the target node is stopped.

* * * * *

UNITED STATES PATENT AND TRADEMARK OFFICE
CERTIFICATE OF CORRECTION

PATENT NO. : 8,891,484 B2
APPLICATION NO. : 13/412666
DATED : November 18, 2014
INVENTOR(S) : Jagdeep Singh Ahluwalia It is certified that error appears in the above-identified patent and that said Letters Patent is hereby corrected as shown below:

Specification

Column 24, Line 7: delete "ARO" and insert -- ARQ --.

Claims

Column 25, Line 63: In Claim 4, after "according to" delete "any of".

Column 26, Line 3: In Claim 6, delete "response handover completion." and insert -- response. --.

Signed and Sealed this
Sixth Day of October, 2015

Michelle K. Lee
*Director of the United States Patent and Trademark Office*